US012562929B2

(12) United States Patent
Wright et al.

(10) Patent No.: US 12,562,929 B2
(45) Date of Patent: Feb. 24, 2026

(54) MULTI-LEVEL BLOCKCHAIN

(71) Applicant: nChain Licensing AG, Zug (CH)

(72) Inventors: Craig Steven Wright, London (GB); Chloe Tartan, London (GB); Katharine Molloy, London (GB)

(73) Assignee: nChain Licensing AG, Zug (CH)

( * ) Notice: Subject to any disclaimer, the term of this patent is extended or adjusted under 35 U.S.C. 154(b) by 110 days.

(21) Appl. No.: 18/573,650

(22) PCT Filed: May 25, 2022

(86) PCT No.: PCT/EP2022/064160
§ 371 (c)(1),
(2) Date: Dec. 22, 2023

(87) PCT Pub. No.: WO2022/268429
PCT Pub. Date: Dec. 29, 2022

(65) Prior Publication Data
US 2024/0291678 A1    Aug. 29, 2024

(30) Foreign Application Priority Data
Jun. 25, 2021    (GB) ..................................... 2109191

(51) Int. Cl.
*H04L 9/00* (2022.01)
(52) U.S. Cl.
CPC ..................................... *H04L 9/50* (2022.05)
(58) Field of Classification Search
CPC ..... H04L 9/50; H04L 2209/56; H04L 9/3255; H04L 9/3236; G06F 21/64; G06F 16/27
See application file for complete search history.

(56) References Cited

U.S. PATENT DOCUMENTS

| | | | | |
|---|---|---|---|---|
| 2018/0139042 A1* | 5/2018 | Binning | .............. | G06F 21/6218 |
| 2019/0245680 A1* | 8/2019 | Boutaba | ................ | H04L 9/0637 |

(Continued)

FOREIGN PATENT DOCUMENTS

| | | | | | |
|---|---|---|---|---|---|
| WO | WO-2018203186 A1 * | 11/2018 | .......... | H04L 9/3239 |
| WO | WO-2019236426 A1 * | 12/2019 | .......... | H04L 9/3297 |

(Continued)

OTHER PUBLICATIONS

"Bitcoin SV Mining Fees Lowered", Bitcoin Association, Jan. 9, 2020, 3 pages, Press Release.

(Continued)

*Primary Examiner* — Meng Vang
(74) *Attorney, Agent, or Firm* — Galvani Smith PLLC; Rowan P. Smith

(57) ABSTRACT

A computer-implemented method of using a multi-level (ML) data chain protocol to embed a data chain on a core blockchain, comprising: obtaining one or more ML transactions, wherein each ML transaction comprises one or more carrier pairs, each carrier pair comprising an input and an output, wherein each output comprises data associated with the data chain, and wherein each input comprises a signature that signs the carrier pair; generating a first ML block of the ML data chain, wherein the first ML block is a core blockchain transaction and comprises the respective carrier pairs of the obtained one or more ML transactions, wherein for each carrier pair, a respective position index of the respective input corresponds to a respective position index of the respective output, and b) a first chain output, wherein the first chain output is for being spent by a respective chain input of a subsequent ML block.

20 Claims, 13 Drawing Sheets

(56)          References Cited

U.S. PATENT DOCUMENTS

| | | | |
|---|---|---|---|
| 2020/0104296 A1 | 4/2020 | Hunn et al. | |
| 2020/0127812 A1* | 4/2020 | Schuler ................. | H04L 9/0637 |
| 2020/0250747 A1* | 8/2020 | Padmanabhan ...... | G06Q 20/065 |
| 2021/0182895 A1* | 6/2021 | Sears ................... | G06Q 20/367 |
| 2021/0216958 A1* | 7/2021 | Pacheco ............... | H04L 9/3239 |

FOREIGN PATENT DOCUMENTS

| | | | | |
|---|---|---|---|---|
| WO | 2020240299 A1 | 12/2020 | | |
| WO | WO-2021092434 A1 * | 5/2021 | ......... | G06Q 20/3829 |

OTHER PUBLICATIONS

"Proof of Work", Bitcoin Wiki, Accessed Dec. 8, 2020, https://wiki.bitcoinsv.io/index.php/Proof_of_Work.
"ZK-Rollups", Ethhub, Accessed Feb. 19, 2021, https://docs.ethhub.io/ethereum-roadmap/layer-2-scaling/zk-rollups/.
GB2109191.3 Combined Search and Abbreviated Examination Report dated Nov. 25, 2021, 6 pages.
PCT/EP2022/064160 International Search Report and Written Opinion dated Sep. 21, 2022, 12 pages.
Shadders, Steve, "On the future of Bitcoin transaction fees", Bitcoin SV, Accessed Dec. 8, 2020, https://bitcoinsv.io/2019/11/24/on-the-future-of-bitcoin-transaction-fees/.
Yin, Maofan et al., "HotStuff: BFT Consensus in the Lens of Blockchain", Computer Science>Distributed, Parallel, and Cluster Computing, Mar. 13, 2018, https://arxiv.org/abs/1803.05069.

* cited by examiner

Transaction
from Alice to Bob

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

105

Client application

402

UI layer

401

Transaction engine

403

Client app (Alice)

| TxID | | | | |
|---|---|---|---|---|
| Version | | | | |
| Inputs | | | Outputs | |
| Outpoint | Unlocking script | nSeq | Value | Locking script |
| $TxID_0 \parallel Index_0$ | $< Sig_0 >< PK_0 >$ | $n_0$ | $x_0$ | [Checksig $PK_3$] |
| $TxID_1 \parallel Index_1$ | $< Sig_1 >< PK_1 >$ | $n_1$ | $x_1$ | [Checksig $PK_4$] |
| $TxID_2 \parallel Index_2$ | $< Sig_2 >< PK_2 >$ | $n_2$ | $x_2$ | [Checksig $PK_5$] |
| | | | $x_3$ | [Checksig $PK_6$] |
| Locktime | | | | |

Figure 7

| TxID | | | | |
|---|---|---|---|---|
| Version | | | | |
| Inputs | | | Outputs | |
| Outpoint | Unlocking script | nSeq | Value | Locking script |
| $TxID_0 \parallel Index_0$ | $< Sig_0 >< PK_0 >$ | $n_0$ | $x_0$ | [Checksig $PK_3$] |
| $TxID_1 \parallel Index_1$ | $< Sig_1 >< PK_1 >$ | $n_1$ | $x_1$ | [Checksig $PK_4$] |
| $TxID_2 \parallel Index_2$ | $< Sig_2 \; S\vert ACP >< PK_2 >$ | $n_2$ | $x_2$ | [Checksig $PK_5$] |
| | | | $x_3$ | [Checksig $PK_6$] |
| Locktime | | | | | a)

| $Version_{MLT}$ | | | | |
|---|---|---|---|---|
| Input | | | | Output |
| Outpoint | Unlocking Script | nSeq | Value | Locking Script |
| $TxID \parallel index$ | $< Sig\ S\vert ACP >$ $< PK >$ | $n$ | $x$ | [Checksig $PK'$] OP_RETURN  <Embedded $Tx$> |
| Locktime | | | | |

Figure 11

| $TxID_{MLB}$ | | | | |
|---|---|---|---|---|
| $Version_{MLB}$ | | | | |
| Inputs | | | | Outputs |
| Outpoint | Unlocking script | nSeq | Value | Locking script |
| $TxID_0$ $\parallel index_0$ | <$MLB_{h-1}$ Puzzle Solution> | $n_0$ | $dust$ | <$MLB_h$ Consensus Proof Puzzle> OP_RETURN <Embedded Block Header> |
| $TxID_1$ $\parallel index_1$ | $< Sig_1 ALL >$ $< PK_1 >$ | $n_1$ | $x_1$ | [Checksig $PK_1'$] OP_RETURN <Embedded Coinbase $Tx$> |
| $TxID_2$ $\parallel index_2$ | $< Sig_2\ S\vert ACP >$ $< PK_2 >$ | $n_2$ | $x_2$ | [Checksig $PK_2'$] OP_RETURN  <Embedded $Tx_0$> |
| ... | ... | ... | ... | ... |
| $TxID_N$ $\parallel index_N$ | $< Sig_N\ S\vert ACP >$ $< PK_N >$ | $n_N$ | $x_N$ | [Checksig $PK_N'$] OP_RETURN <Embedded $Tx_{N-1}$> |
| $Locktime_{MLB}$ | | | | |

Figure 13

| $TxID_{embedded}$ | | | | | |
|---|---|---|---|---|---|
| Version | | | | | |
| Input | | | Output | | |
| Outpoint | Unlocking script | nSeq | Value | Locking script | |
| $TxID_A \parallel Index_A$ | $< Sig_A >< PK_A >$ | $n$ | $x_0$ | [Checksig $PK_M$] | |
| | | | $x_1$ | [Checksig $PK'_A$] | |
| Locktime | | | | | |

Figure 14

| $TxID_{MLT}$ | | | | |
|---|---|---|---|---|
| 0x0000002A | | | | |
| Input | | | Output | |
| Outpoint | Unlocking Script | nSeq | Value | Locking Script |
| $TxID_2 \parallel index_2$ | $< Sig_2 \, S\|ACP >$ $< PK_2 >$ | 0xFFFFFFFF | $s_2$ | [Checksig $PK'_2$] OP_RETURN $<TxID_{embedded}>$ |
| 0x00000000 | | | | |

Figure 15

| $TxID_{coinbase}$ | | | | |
|---|---|---|---|---|
| Version | | | | |
| Input | | | Output | |
| Outpoint | Unlocking script | nSeq | Value | Locking script |
| 0x00000000 | <Height, Coinbase script> | 0xFFFFFFFF | Block reward + Tx fees | [Checksig $PK_B$] |
| Locktime | | | | |

Figure 16

| $TxID_{MLB}$ | | | | |
|---|---|---|---|---|
| 0x0000002A | | | | |
| Inputs | | | Outputs | |
| Outpoint | Unlocking script | nSeq | Value | Locking script |
| $TxID_{MLB_{k-1}}$ ‖ 0 | $<hash(EBH_k)>$ | $n$ | $dust$ | $<hash(EBH_k)>$ OP_CAT OP_SHA256 $<EDT>$ OP_LESSTHAN OP_RETURN $<EBH_k>$ |
| $TxID_1$ ‖ $index_1$ | {} | $n$ | $x_1$ | [Checksig $PK_1'$] OP_RETURN $<$Embedded Coinbase $Tx>$ |
| $TxID_3$ ‖ $index_2$ | $<Sig_2\ S|ACP><PK_2>$ | $n$ | $x_2$ | [Checksig $PK_2'$] OP_RETURN $<$Alice's Embedded $Tx_0>$ |
| ... | ... | ... | ... | ... |
| $TxID_N$ ‖ $index_N$ | $<Sig_N\ S|ACP><PK_N>$ | $n$ | $x_N$ | [Checksig $PK_N'$] OP_RETURN $<$ Embedded User $Tx_{N-3}>$ |
| 0x00000000 | | | | |

Figure 17

| Secondary chain data | Equivalent on core chain in ML protocol |
|---|---|
| Embedded Block header<br>• Block version number<br>• Previous header hash<br>• Merkle root hash<br>• Timestamp<br>• Difficulty target<br>• Nonce | Data string in OP_RETURN of index 0<br>• Version number in embedded block header<br>• Hash of previous embedded block header<br>• Merkle root hash of embedded transactions<br>• Timestamp of embedded block<br>• Difficulty target of embedded block<br>• Nonce of embedded block |
| Transaction count | TxIn count – 1 |
| Embedded Coinbase Transaction | Data string in OP_RETURN of index 1 |
| Embedded User Transactions | Data strings in OP_RETURN from index 2+ |
| Location Identifiers<br>• Secondary chain transaction<br>• Secondary chain block | <br>• Core chain block height, $TxID$, index<br>• Core chain block height, $TxID$ |

Figure 19

MULTI-LEVEL BLOCKCHAIN

CROSS REFERENCE TO RELATED APPLICATIONS

This application is the U.S. National Stage of International Application No. PCT/EP2022/064160 filed on May 25, 2022, which claims the benefit of United Kingdom Patent Application No. 2109191.3, filed on Jun. 25, 2021, the contents of which are incorporated herein by reference in their entireties.

TECHNICAL FIELD

The present disclosure relates to a method of embedding data on the blockchain using a multi-level data chain protocol.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

SUMMARY

It is recognised herein that a blockchain that utilises a UTXO-based transaction model can be used as a carrier of a secondary data chain. In some examples, the secondary data chain may be a secondary blockchain (i.e. a blockchain other than the one acting as the carrier). This may be beneficial if an existing, secondary blockchain or its network becomes unviable, e.g. due to lack of hash power. For instance, units of a digital currency held by held by the secondary network's users may be preserved by embedding the secondary blockchain within the viable, core blockchain. An alternative scenario may be where the owners of a private blockchain require proofs of data integrity. This can be achieved by embedding the private data in its raw form or as a cryptographic commitment within a public, core blockchain as an immutable record of the data. In other examples, the secondary data chain may be non-blockchain related and in general may be any data structure where the data is arranged as a chain, e.g. an append-only log. Examples of such data structures include communication chains (e.g. an email or text message chain), move-ordered games (e.g. chess), etc. By using the core blockchain as a carrier of the secondary data chain, the secondary chain inherits the advantages of the core blockchain including, amongst other things, immutability, traceability, transparency, and security of data.

According to one aspect disclosed herein, there is provided a computer-implemented method of using a multi-level (ML) data chain protocol to embed a data chain on a core blockchain, wherein the method is performed by a ML block producer and comprises: obtaining one or more ML transactions, wherein each ML transaction comprises one or more respective carrier pairs, each carrier pair comprising a respective input and a respective output, wherein each respective output comprises respective data associated with the data chain, and wherein each respective input comprises a respective signature that signs the respective carrier pair; generating a first ML block of the ML data chain, wherein the first ML block is a core blockchain transaction and comprises a) the respective carrier pairs of the obtained one or more ML transactions, wherein for each carrier pair, a respective position index of the respective input corresponds to a respective position index of the respective output, and b) a first chain output, wherein the first chain output is for being spent by a respective chain input of a subsequent ML block; and causing the first ML block to be recorded on the core blockchain.

The term "multi-level" (ML) protocol refers to the protocol that embeds a secondary data chain as a higher-level chain of data above (i.e. using) the underlying core blockchain (i.e. the first level blockchain). The data chain may be interpreted as a second level blockchain, as it comprises blocks of data (i.e. the ML blocks) in the form of core transactions of the first level blockchain. Note that even in examples where the secondary data chain is itself not a blockchain (e.g. a communication chain), the secondary data is still structured (i.e. embedded) on the core blockchain using blocks, which are referred to as ML blocks. According to the ML protocol, a ML block is a core blockchain transaction. An ML block is constructed based on one or more ML transactions. An ML transaction comprises one or more carrier pairs. A carrier pair is an input-output pair, where the output comprises embedded data of the secondary chain, which may or may not be in an encrypted form, e.g. hashed using a hash function. Each carrier pair is signed using a respective signature. That is, a single signature signs a single carrier pair. This enables carrier pairs to be placed into an ML block without invalidating the signatures. An ML block also includes a chain input and a chain output, which are used to chain ML blocks together, which is analogous to how block headers of the core blockchain are used to chain core blocks together. Note that an ML transaction may consist of carrier pairs, in which case the ML transaction may form part of the ML block. In other examples, the ML transaction may include other data that is not required to be included in the ML block, in which the carrier pairs may be extracted and placed into the ML block.

To summarise, a chain of core blockchain transactions acts as a chain of blocks of the ML data chain (or ML blockchain). Each ML block includes one or more carrier pairs, where each carrier pair includes embedded data of the secondary data chain, e.g. secondary blockchain.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 6 is a schematic representation of an example core blockchain transaction, FIG. 7 schematically illustrates how transaction information signed by a S|ACP signature is used to authorise the spend of a particular input, FIG. 8 schematically illustrates an example serialisation format for a) a UTXO-based transaction, b) the transaction inputs, and c) the transaction outputs, FIG. 9 schematically illustrates the structure of an example core blockchain block and the relationship to the previous block in the blockchain, FIG. 10 schematically illustrates an example of a ML transaction containing a S|ACP-signed input-output carrier pair where the embedded Tx data is included after an OP_RETURN code, FIG. 11 schematically illustrates an example of a ML block where the block information is embedded in OP_RETURN outputs, FIG. 13 is an example of a secondary blockchain transaction, FIG. 14 is an example of an ML transaction that embeds a secondary blockchain transaction, FIG. 15 is an example of a coinbase transaction of the secondary blockchain, FIG. 16 is an example of a candidate ML block, FIG. 17 shows the mapping of elements of the ML block to their equivalent on the core blockchain.

DETAILED DESCRIPTION OF EMBODIMENTS

1. Example System Overview

Figure 1:
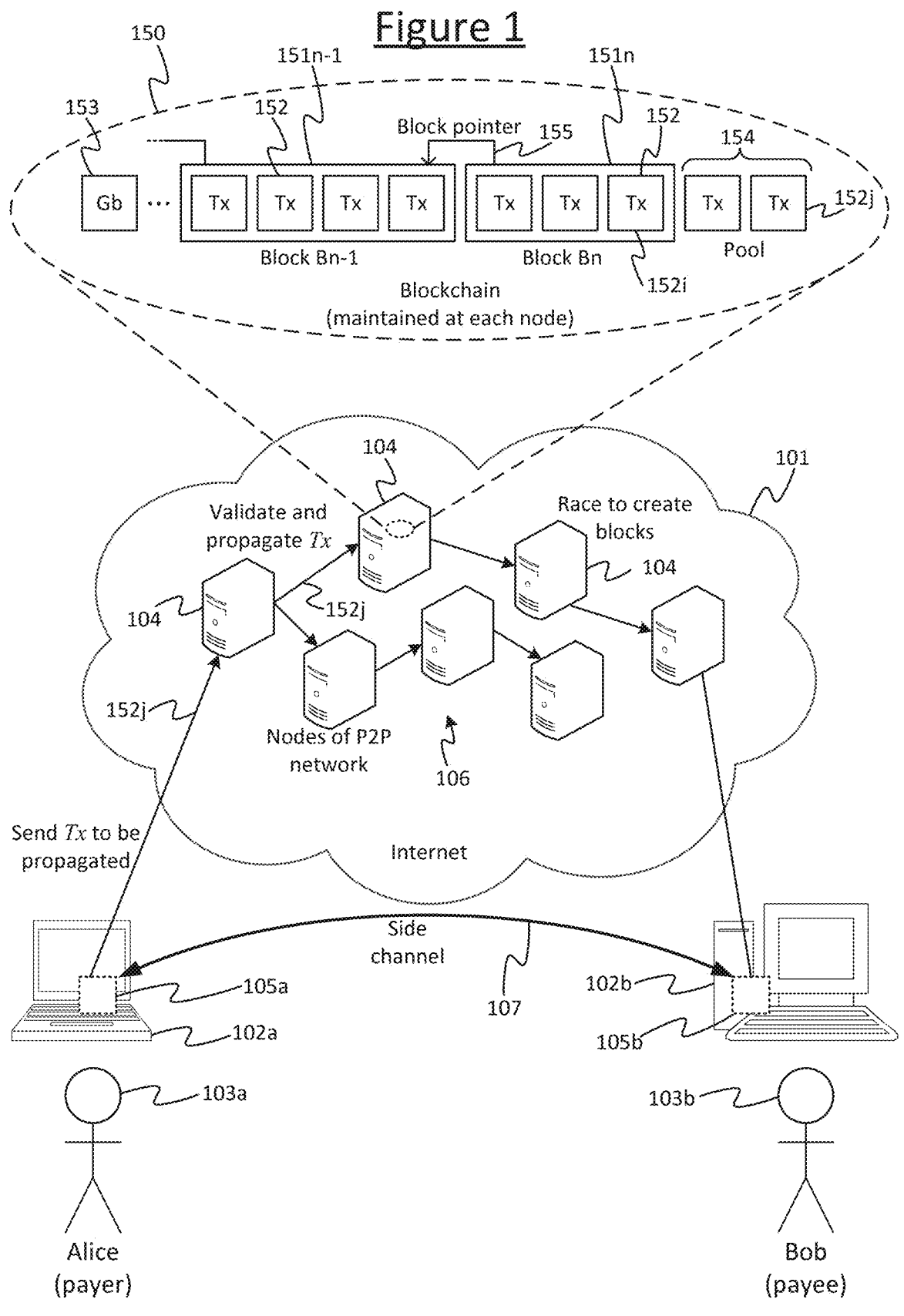
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151.

The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly.

In some transaction protocols, the condition for validation may be configurable on a per-transaction basis by scripts included in the transactions 152.

Alternatively the condition could simply be a built-in feature of the node protocol, or be defined by a combination of the script and the node protocol.

On condition that the newly received transaction 152$j$ passes the test for being deemed valid (i.e. on condition that it is "validated"), any blockchain node 104 that receives the transaction 152$j$ will add the new validated transaction 152 to the ordered set of transactions 154 maintained at that blockchain node 104. Further, any blockchain node 104 that receives the transaction 152$j$ will propagate the validated transaction 152 onward to one or more other blockchain nodes 104 in the network 106. Since each blockchain node 104 applies the same protocol, then assuming the transaction 152$j$ is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152$j$). Once the proof-of-work has been done for the pool 154 including the new transaction 152$j$, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

2. UTXO-Based Model

Figure 2:
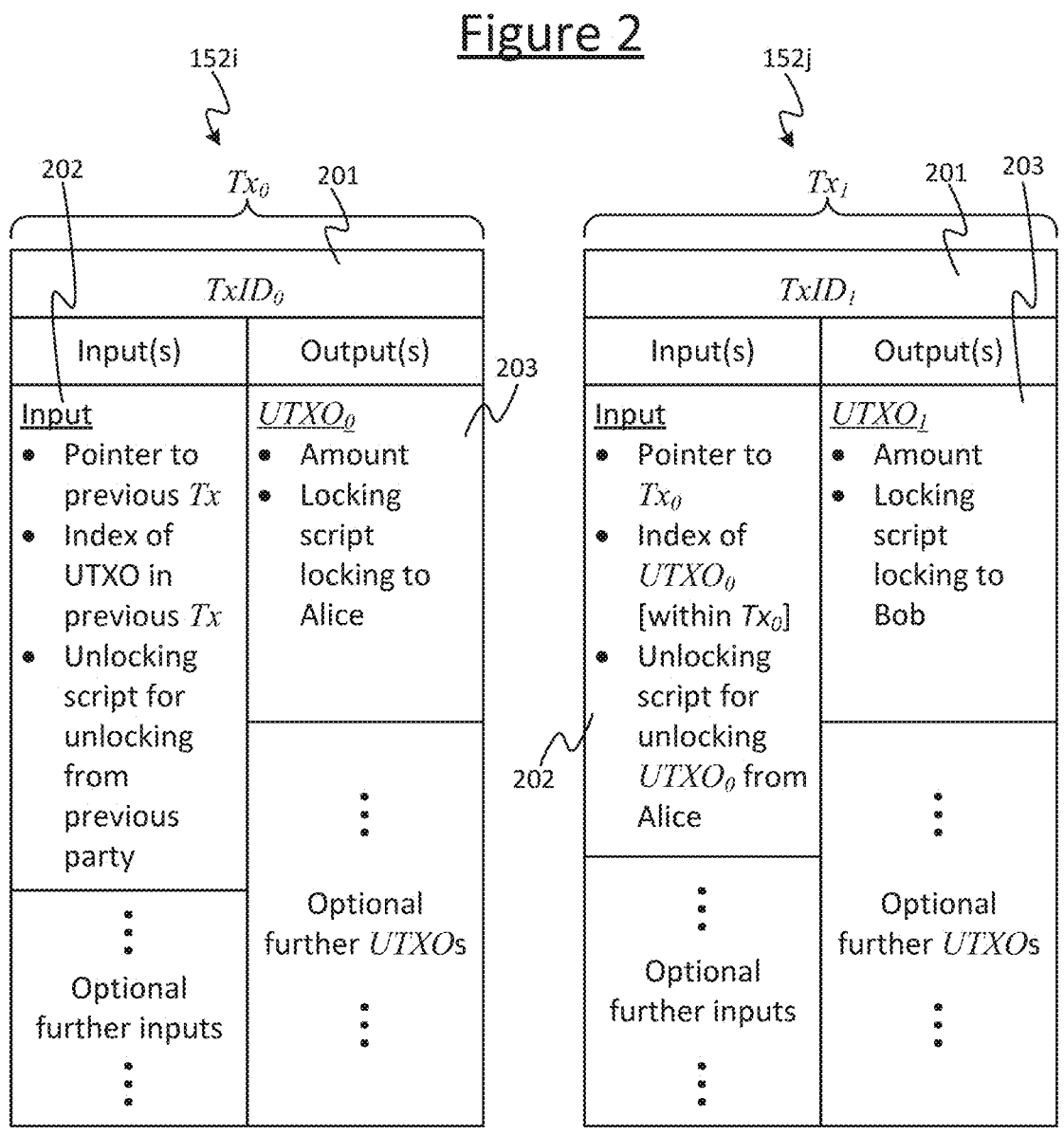
FIG. 2 schematically illustrates some examples of transactions which may be recorded in a blockchain.

FIG. 2 illustrates an example transaction protocol. This is an example of a UTXO-based protocol. A transaction 152

(abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103$a$ wishes to create a transaction 152$j$ transferring an amount of the digital asset in question to Bob 103$b$. In FIG. 2 Alice's new transaction 152$j$ is labelled "$Tx_1$". It takes an amount of the digital asset that is locked to Alice in the output 203 of a preceding transaction 152$i$ in the sequence, and transfers at least some of this to Bob. The preceding transaction 152$i$ is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. Tx could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$< Sig \ P_A > \ < P_A > \ \| \ [Checksig \ P_A]$$

where "‖" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in Tx meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

3. Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

4. Client Software

Figure 3A:
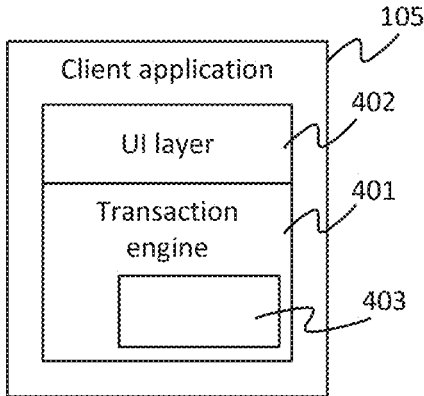
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly. In accordance with embodiments disclosed herein, the transaction engine 401 of each client 105 comprises a function 403 . . . .

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
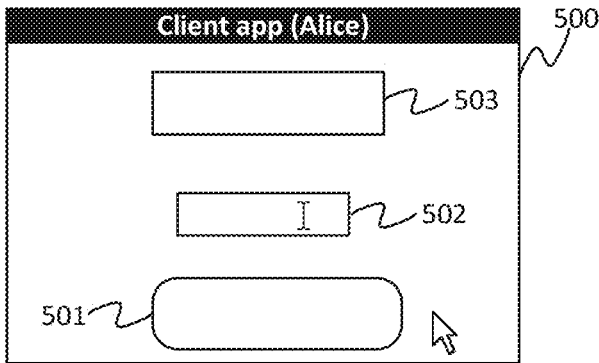
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105a on Alice's equipment 102a. It will be appreciated that a similar UI may be rendered by the client 105b on Bob's equipment 102b, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to . . . .

Alternatively or additionally, the UI elements may comprise one or more data entry fields 502, through which the user can . . . . These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

5. Node Software

Figure 4:
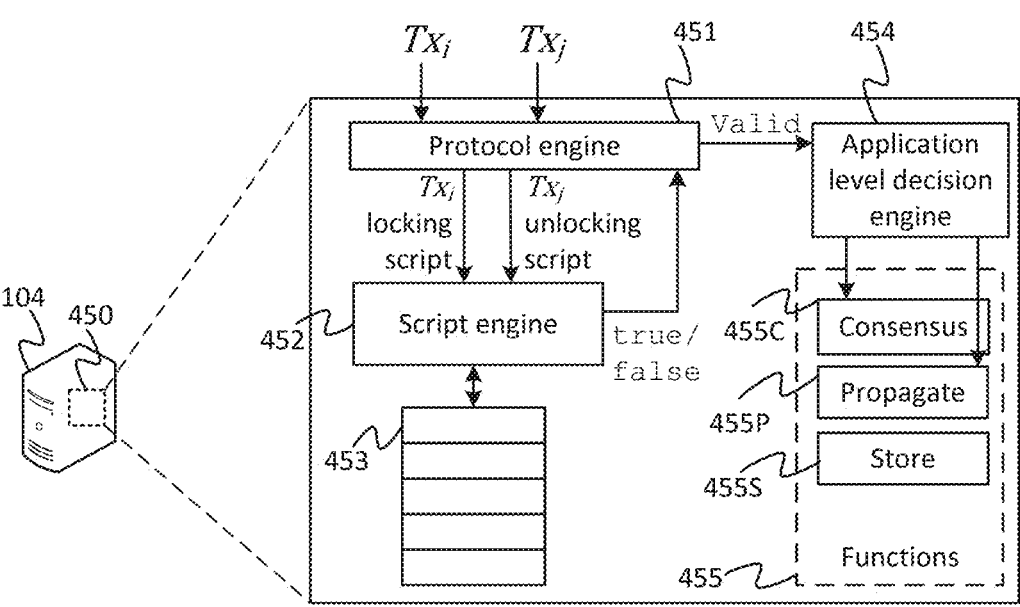
FIG. 4 is a schematic block diagram of some node software for processing transactions, FIG. 5 schematically illustrates an example system for implementing a multi-level blockchain protocol.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152$j$ (Tx$_j$) is received having an input pointing to an output (e.g. UTXO) of another, preceding transaction 152$i$ (Tx$_{m-1}$), then the protocol engine 451 identifies the unlocking script in Tx$_j$ and passes it to the script engine 452. The protocol engine 451 also identifies and retrieves Tx$_i$ based on the pointer in the input of Tx$_j$. Tx$_i$ may be published on the blockchain 150, in which case the protocol engine may retrieve Tx$_i$ from a copy of a block 151 of the blockchain 150 stored at the node 104. Alternatively, Tx$_i$ may yet to have been published on the blockchain 150. In that case, the protocol engine 451 may retrieve Tx$_i$ from the ordered set 154 of unpublished transactions maintained by the node 104. Either way, the script engine 451 identifies the locking script in the referenced output of Tx$_i$ and passes this to the script engine 452.

The script engine 452 thus has the locking script of Tx$_i$ and the unlocking script from the corresponding input of Tx$_j$. For example, transactions labelled Tx$_0$ and Tx$_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of Tx$_j$ does not exceed the total amount pointed to by its inputs, and that the pointed-to output of Tx$_i$ has not already been spent by another valid transaction. The protocol engine 451 evaluates the result from the script engine 452 together with the one or more protocol-level conditions, and only if they are all true does it validate the transaction Tx$_j$. The protocol engine 451 outputs an indication of whether the transaction is valid to the application-level decision engine 454. Only on condition that Tx$_j$ is indeed validated, the decision engine 454 may select to control both of the consensus module 455C and the propagation module 455P to perform their respective blockchain-related function in respect of Tx$_j$. This comprises the consensus module 455C adding Tx$_j$ to the node's respective ordered set of transactions 154 for incorporating in a block 151, and the propagation module 455P forwarding Tx$_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

6. Core Blockchain Example

This section describes an example of a core (i.e. first tier) blockchain that may be used as a carrier of a secondary data chain according to embodiments of the present invention. Note that these examples are for illustrative purposes only.

6.1 Core Transactions

A transaction is a message that comprises inputs and outputs, which are typically used to transfer the ownership or control of amounts of a digital asset from one set of addresses to another. FIG. 6 illustrates a transaction that assigns amounts of a digital asset from three inputs controlled by public keys $PK_0$, $PK_1$, $PK_2$, to four outputs controlled by public keys $PK_3$, $PK_4$, $PK_5$, $PK_6$.

The example fields correspond to the following information:

Version: A 4-byte integer which has no function or restrictions on its value.

Inputs: An array of transaction inputs, each comprising of the following sub-fields:

Outpoint: A structure identifying the UTXO being spent, comprising:

TxID: The 32-byte transaction identifier TxID for the UTXO being spent.

Index: The 4-byte output index n for the UTXO being spent.

Unlocking script: The script which, when combined with the locking script for the input, validates the coin to be spent.

nSeq: A 4-byte integer that defaults to 0xFFFFFFFF. Values less than this default (maximum) indicate that this transaction may not be final and can be superseded by a transaction that spends the same input and has a higher sequence number. The transaction is considered final when all sequence numbers have been set to the maximum, or when the locktime is reached.

Outputs: An array of transaction outputs, each comprising of the following sub-fields:

Value: An 8-byte integer that indicates the value (in Satoshis) of the output.

Locking script: The locking script, which contains the conditions that must be met to spend the coin Locktime: A 4-byte integer that defaults to 0. Values greater than 0 enforce a delay, indicating the earliest time at which the transaction may be included in a block, either by block height (for values<500,000,000) or by UNIX time otherwise.

6.2 Signatures

When creating a signature, the ECDSA algorithm requires both a private key and a message. The message is formed based on some of the details of the transaction. The verification of a signature provides:

authorisation to spend the UTXO input it applies to, and authentication of the transaction details in the signature message.

Each signature contains a sighash flag that indicates which inputs and outputs are signed. The SINGLE|ANYONE CAN PAY (S|ACP) flag variant secures the input that the signature validates the spend of, and the output in the corresponding index position. FIG. 7 highlights (in grey) the information that would be secured if a S|ACP signature was created for the unlocking script in the input at index 2. An input-output pair signed using S|ACP places no restrictions on the information in other inputs or outputs, so multiple S|ACP-signed pairs can be combined together into a single transaction without any of the signatures being invalidated. However, if a pair has an input whose value is larger than the signed output, the information could be copied by a malicious interceptor (operating between the user and the network) into a competing transaction where the excess unassigned value is rerouted to the interceptor's address. Such transactions are therefore often routed directly to a trusted node in the network.

6.3 Data Outputs

Within a core blockchain transaction, one or more outputs may contain one or more opcodes that enable a data payload to be included in the output. For example an OP_RETURN code may be followed by some data (in the form of a string). The opcode is placed at the end of the unlocking script, which allows transactions to serve as data carriers without disrupting the signature validation process. When a data transaction is published on the blockchain, there exists an immutable record of the data that is embedded in the output. OP_RETURN codes can either be preceded by OP_FALSE (0), which renders the UTXO that is created by the output unspendable (i.e. it does not need to be stored by full nodes in the UTXO set), or used without OP_FALSE to create a spendable UTXO. Alternative opcodes may be used to include data in an output, e.g. OP_PUSH and OP_DROP.

6.4 Version Number

The transaction version number is a 4-byte field containing a number. Currently, no use is made of the nVersion field. It is therefore available for use in identifying subsets of transactions within the larger blockchain. A field size of 4 bytes gives $2^{32}$ possible values. This offers a large scope for assigning transaction versions for different use cases. A non-standard transaction version does not render a transaction invalid under the current consensus rules, so by default nodes respond identically to all transactions regardless of their version.

6.5 Serialisation Format

Figure 8:
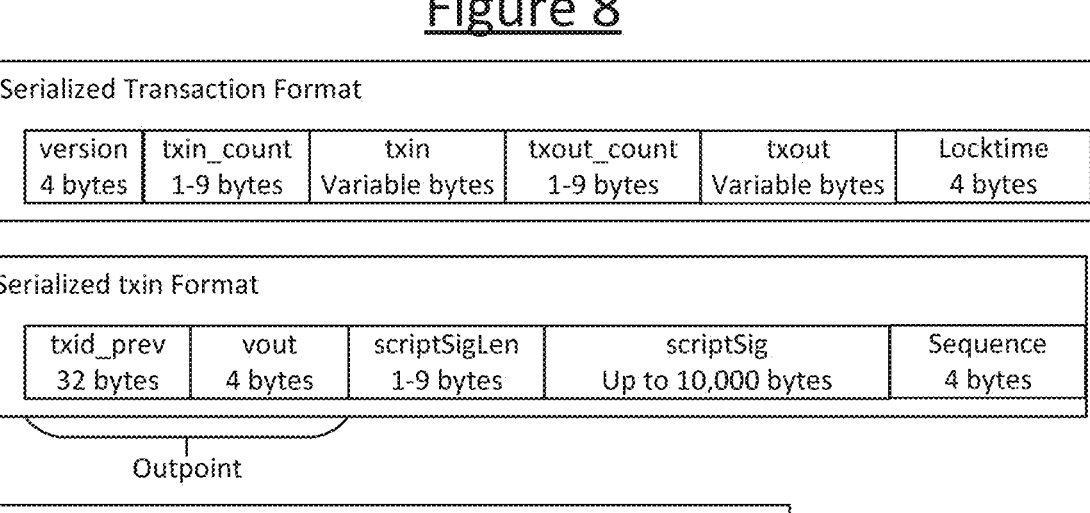

A transaction can be represented as a single data string using the serialisation format illustrated in FIG. 8. The whole transaction is shown in (a), while (b) and (c) illustrate the expanded format of the txin and txout fields (one of which is created for each input and output respectively). The txin and txout serialisations are concatenated in order of their index position and placed within the full transaction serialisation in (a). This gives a string of variable length that contains all the information about a single transaction.

6.6 Core Blocks

Figure 9:
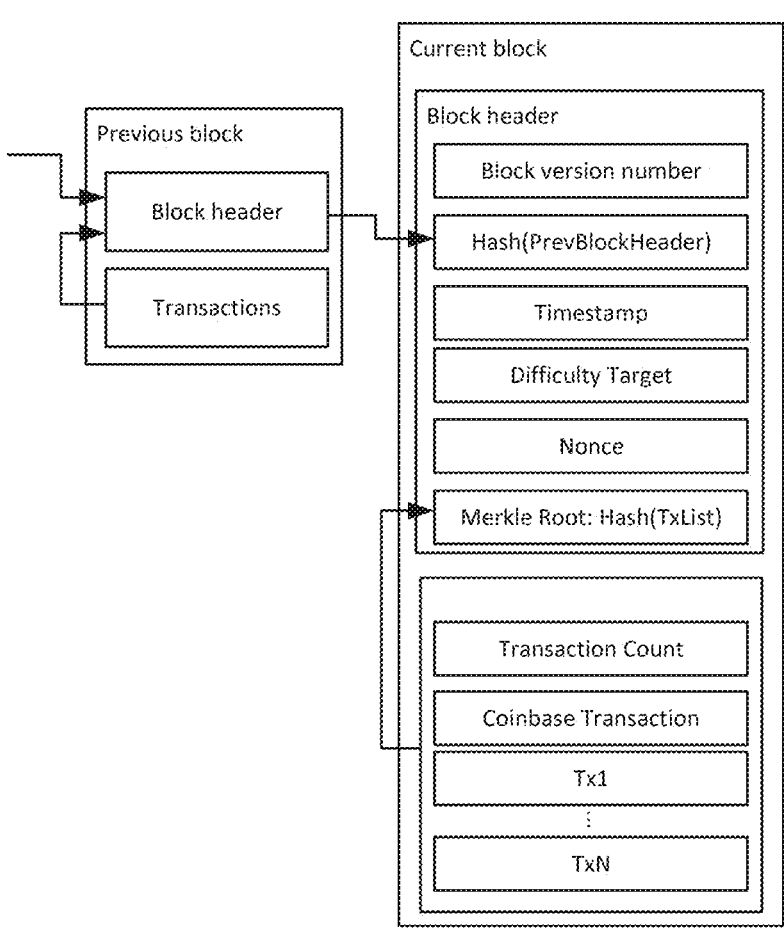

A block is a data structure containing a set of transactions and some additional fields related to how a block is appended to the longest chain (i.e. the chain with the most proof-of-work). FIG. 9 illustrates an example block structure. The fields of an example block are as follows:

Block header: A structure giving the information about how and when a block was mined, and what it contains. This comprises the following six sub-fields:

Version: A 4-byte integer indicating the set of protocol rules used for block validation.

Hash of Previous Block Header: A 32-byte SHA-256 double hash of the previous block header.

Merkle root: A 32-byte SHA-256 double hash derived from the Merkle tree of transactions.

Timestamp: A 4-byte integer encoding the Unix time at which a block producer generated the header.

Difficulty Target: A 4-byte integer encoding the target difficulty required for the block to be mined.

Nonce: A 4-byte integer chosen to achieve a block header hash of the required difficulty.

Transactions: A structure detailing the transactions within the block. It comprises:

Transaction Count: An integer of variable length indicating the number of transactions contained within the block.

Transaction List: A structure containing transaction data for the full list of transactions included in a block. The first transaction in this list is always the coinbase transaction (see below).

6.7 Coinbase Transaction

Normally, the first transaction in a block differs from the structure for transactions in general, because it is used by block producers to claim the mining incentive. This is also known as a 'generation' transaction because a new amount of the digital asset is generated each block. The new amount is called the 'block reward' and is contained in the transaction output. The coinbase transaction data structure only differs from the standard form in the fields comprising the inputs. The coinbase transaction is only allowed to contain a single input, as defined below:

Outpoint: There is no UTXO being spent in this case. The sub fields are therefore:

TxID: An empty field, indicating lack of a previous outpoint.

Index: The value 0, indicating lack of a previous outpoint.

Unlock script: There is no UTXO to 'unlock'. This script is now formed of two elements:

Height: The 4-byte block height of the block containing this transaction.

Coinbase Script: Arbitrary data up to a maximum of 96 bytes.

nSeq: A 4-byte integer that defaults to 0xFFFFFFFF.

7. Multi-Level Blockchain

Figure 5:
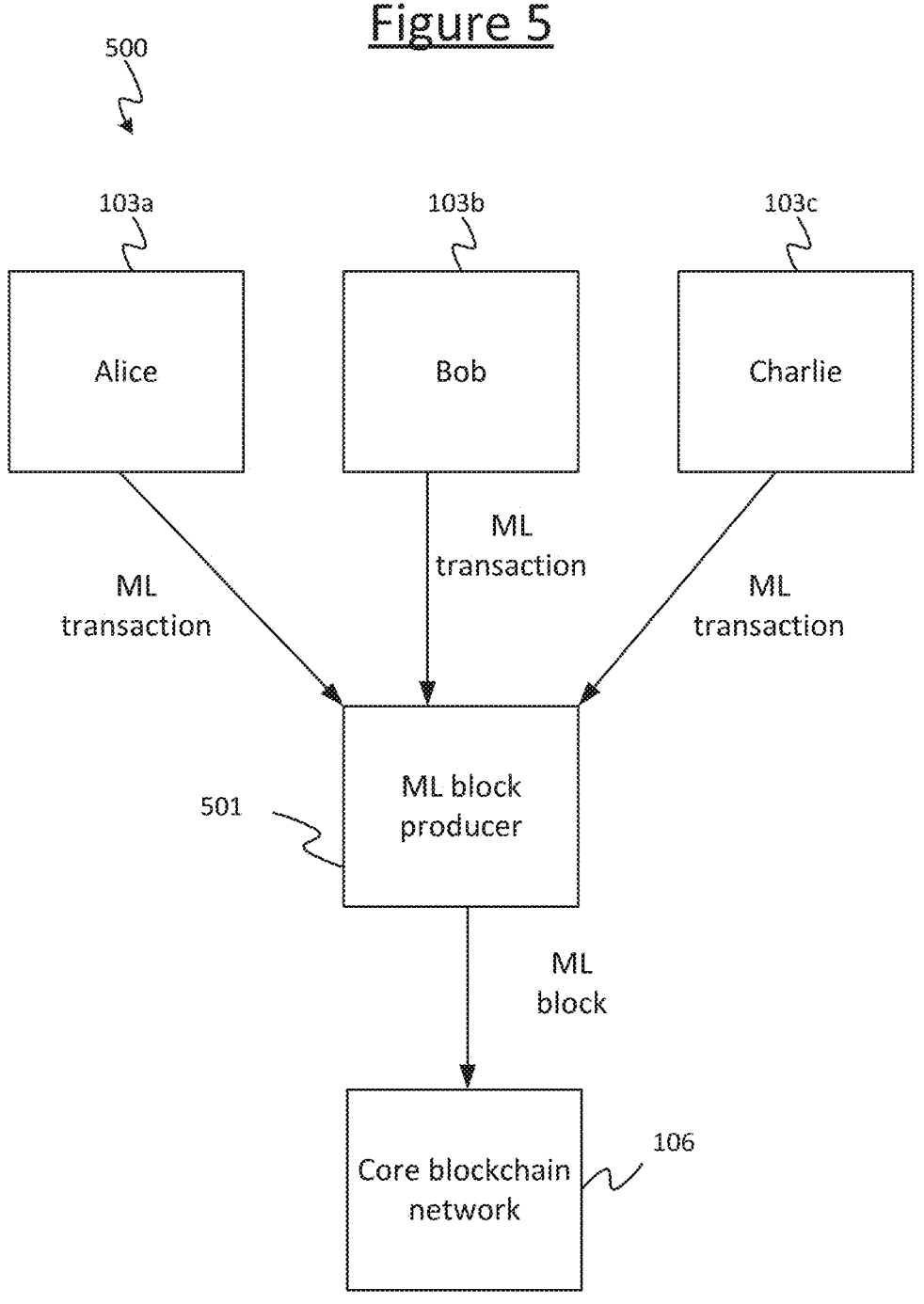

FIG. 5 illustrates an example system 500 for implementing a multi-level (ML) blockchain protocol. The system 500 comprises one or more entities configured to submit ML transactions to an ML block producer 501. For instance, system 500 may comprise one or more users, e.g. Alice 103a, Bob 103b, and Charlie 103c, each being configured to generate ML transactions. It will be appreciated that the system 500 may comprise any number of users. Note also that the entities configured to submit ML transactions need not be users in the sense of a human operating a device. That is, one or more of such entities may be machines, smart contracts, or the like. The ML block producer 501 is configured to receive and/or generate ML transactions, generate ML blocks, i.e. core blockchain transactions, and submit ML blocks to the core blockchain network 106. The ML block producer 501 may be a blockchain node 104 of the core blockchain network 106. That is, the ML block producer may be configured to generate both ML blocks and core blockchain blocks 151. In other examples, the ML block producer may be a simplified payment verification (SPV) client application, i.e. a client application configured to implement the SPV method. The skilled person will be familiar with the SPV method. It is also not excluded that the ML block producer may be a user, e.g. Alice 103a. That is, a user 103 may generate ML transactions and ML blocks. The system 500 may comprise multiple ML block producers 501.

The ML blockchain protocol is used to structure (or embed) data associated with a data chain (a "secondary data chain" (e.g. a secondary blockchain) using transactions of a core blockchain. Data associated with the secondary data chain (e.g. secondary blockchain transactions) is embedded in the output of an input-output pair (referred to as a carrier pair). The carrier pair is signed with a signature, e.g. an ECDSA signature. The data may be encrypted. The ML block producer 501 is configured to obtain ML transactions, each of which comprises one or more carrier pairs. The ML block producer 501 may generate one or more ML transactions. That is, the ML block producer 501 may obtain (e.g. receive or generate) the data to be embedded in a carrier pair. Preferably, the data is communicated via a secure communication channel. Additionally or alternatively, the ML block producer 501 may receive one or more ML transactions, each of which comprises one or more carrier pairs. The ML transactions may be communicated via the core blockchain network. For instance, the ML block producer 501 may receive ML transactions from one or more users 103.

The ML block producer 501 is configured to generate a ML block based on the obtained (e.g. received) ML transactions. That is, the ML block producer 501 is configured to construct a ML block (which is a core blockchain transaction) using one or more carrier pairs from one or more ML transactions. The input and output of each carrier pair occupies the same position in the list of inputs and list of outputs of the ML block, respectively. The carrier pairs may be positioned in the ML block based on an order in which the carrier pairs (or the corresponding ML transaction) were obtained. In other examples, the position of the carrier pairs in the ML block may be arbitrarily assigned. The ML block includes a chain output that is used to chain ML blocks. The chain output may be the output that appears logically first in the ML block, although this is not essential. The ML block also includes a chain input that references and unlocks a chain output of the previous ML block in the ML blockchain. Again, the chain output may be the input that appears logically first in the ML block.

The ML block producer 501 is configured to cause the ML block to be recorded on the core blockchain as core blockchain transaction. Depending on the capabilities of the ML block producer 501, this may involve including the ML block in a core block of the core blockchain. Additionally or alternatively, the ML block producer 501 may submit the ML block to one or more nodes of the core blockchain network 106.

In some examples, the ML block producer 501 may maintain (i.e. store in memory) a pool (i.e. list) of ML transactions (or carrier pairs extracted from ML transactions) that have been received and/or generated. The ML block producer 501 may construct an ML block by taking carrier pairs from the pool. For instance, the ML block producer 501 may choose to include a certain amount, or less than a certain amount, of carrier pairs in an ML block. In that case, the ML block producer 501 may place some carrier pairs in a first ML block, submit the first ML block to the core network 106, then place some carrier pairs in a second ML block, and so on. In other words, the ML block producer 501 uses the pool as a source of carrier pairs to construct ML blocks.

Returning now to the signature that signs the carrier pair, in some examples the signature may be associated with a signature flag (sometimes referred to as a "sighash flag") that indicates that the signature signs only that carrier pair. This is useful for validating the signature as it makes the validator aware of the message that the signature signs. The signature flag will depend on the core blockchain protocol. For instance, one example core blockchain protocol may use the signature flag "SINGLE|ANYONECANPAY" for this purpose.

As an optional feature, each ML transaction may be an invalid core blockchain transaction that comprises the carrier pair(s). That is, the carrier pairs(s) may be submitted to the ML block producer 501 as an invalid core blockchain transaction. This prevents the carrier pairs being accidentally included in the core blockchain outside of an ML block. One technique for invalidating a transaction is to not include any transaction fees. Another technique is to modify part of the carrier pair after generating the transaction such that the signature, and therefore the transaction, is invalid. Upon receiving the invalid transaction, the ML block producer 501 may re-modify the data in the carrier pair such that the signature is valid. In order to do this, the ML block producer 501 must know which part of the carrier pair has been modified and how. This may be agreed upon as part of the ML protocol.

In some examples, each ML block may comprise a block header. The block header may be placed in the chain output of the ML block. The block header may comprise one or more values related to the ML block. One of those values may be a Merkle root generated based on the carrier pairs in the ML block. The Merkle root may be generated based on the carrier pairs as a whole (i.e. each leaf hash of the corresponding Merkle tree is a hash of a respective carrier pair), or on only the data outputs of the carrier pairs (i.e. each leaf hash of the corresponding Merkle tree is a hash of a respective data output of a respective carrier pair). This means that the Merkle tree relates only to the secondary data chain. Other values that may be included in the block header are any one or more of the following: a timestamp at which the ML block was created or submitted to the core network 106, a hash of the block header of the previous ML block (i.e. the ML block referenced by the chain input of the current ML block), a difficulty target and nonce (discussed below), a number of the carrier pairs in the ML block, etc.

As mentioned above, ML blocks are chained together via the chain inputs and chain outputs. That is, a chain input of the $n^{th}$ ML block spends the chain output of $n-1^{th}$ block, and the chain input of the $n+1^{th}$ block spends the chain output of the $n^{th}$ block. In some examples each chain output may comprise a puzzle, and each chain input may comprise a solution that solves the puzzle of the chain output being spent. The puzzle may be a proof-of-work (PoW) hash puzzle. That is, the locking script of a given chain output may be configured to enforce a PoW hash puzzle. This is analogous as to how some core blockchains require a PoW puzzle to be solved in order to append a new core block. The PoW hash puzzle of a given ML block is a function of the block header of that ML block and a target difficulty. The skilled person will be familiar with the concept of PoW hash puzzles and a target difficulty per se. The target difficulty may be the same for every ML block, or it may be changed in order to make it easier or header to solve the hash puzzle, which in turn affects the rate at which new ML blocks may be added to the ML chain. More specifically, the PoW hash puzzle of a given ML block is a function of a block header hash (i.e. a hash of a block header) of that ML block. The PoW hash puzzle is configured to take, as an input from a chain input of the next ML block, a block header hash of the next ML block, combine (e.g. concatenate) the block header hash of the current ML block with the block header hash of the next ML block, and determine whether a hash of the combination meets the difficulty target. Depending on the specific PoW hash puzzle, this may comprise determining whether the hash of the combination is less than (or less than or equal) to the difficulty target, which is itself a number. The PoW hash puzzle is configured such that the locking script will only unlock if the difficulty target is satisfied. An example locking script configured to implement a PoW hash puzzle is shown further below in section 8.

In these examples, when constructing a new ML block the ML block producer 501 must find a block header hash (a "solution") that, when processed by the PoW puzzle of the previous ML block, satisfies the difficulty target of the current ML block which is set by and placed in the locking script of the previous ML block. In order to find such a solution, the ML block producer 501 may modify part of the block header such that the difficulty target will be satisfied when the block header hashes are combined and hashed. The part of the blockheader that is modified may be a nonce value. For instance, the ML block producer may iterate through a sequence of nonce values until finding a nonce value that results in a solution to the PoW hash puzzle.

As an alternative to the PoW hash puzzle described above, each ML block may comprise, in its chain output, a PoW R-puzzle. R-puzzles are used to prove knowledge of an ephemeral key k that is used to derive the r value of a ECDSA signature:

$$r = [R]_x \text{ where } R = k \cdot G \bmod n = (x, y)$$

The ephemeral key is independent of the public-private keypair but is a critical security parameter in ECDSA signatures. They are designed for single use to prevent compromise of a private key. The main features of R-puzzles are:
1. they allow users to use any public-private keypair when solving the knowledge proof,
2. an extra signature is typically used to prevent signature forgeability by anyone that intercepts the proof, and
3. they offer an alternative to P2PKH or hash puzzles in script.

A PoW r-puzzle requires a spender to not only solve the r-puzzle, but also do work to find a value (e.g., nonce) that results in a hash value below a certain difficulty target D. Following the same logic described above for the PoW hash puzzle to chain consecutive UTXOs, the PoW r-puzzle facilitates a check of the below equation in script:

$$H(H(r_h \| BlockHeader_h) \| H(r_{h-1} \| BlockHeader_{h-1})) < D$$

A puzzle is created based on the r value of the ECDSA signature for ease of computation but a puzzle based on R can also be covered. The chain output of a ML block may comprise a locking script as follows:

OP_DUP OP_3 OP_SPLIT OP_NIP OP_1 OP_SPLIT
   OP_SWAP OP_SPLIT OP_DROP
OP_2 OP_ROLL OP_CAT OP_SHA256 ⟨H(r$_h$‖Block-
   Header$_h$)⟩ OP_CAT OP_SHA256
⟨D⟩ OP_LESSTHAN OP_VERIFY
OP_OVER OP_CHECKSIGVERIFY OP_CHECKSIG The chain input of the next ML block (at height h+1) comprises an unlocking script as follows:

$$\langle sig'\rangle\langle P\rangle\langle Blockheader_{h+1}\rangle\langle sig_{r_{h+1}}\rangle$$

The signature sig$_r$ uses the required r value. P is the ML block producer's public key. The extra signature sig' is based on a different r value and is added for security reasons as stated above: it prevents malicious nodes from forging a signature that unlocks the R-puzzle without actual knowledge of the r value in the signature sig=(r, s). In some examples, this additional signature is not required.

The first line in the locking script extracts r. The second line constructs the left-hand side of the PoW equation. The third line checks that the condition on the right-hand side of the PoW equation holds. The fourth line carries out signature verification checks on both signatures in the unlocking script.

It will be appreciated that the above locking script is just one example of how a PoW r-puzzle may be implemented. More generally, the PoW r-puzzle comprises a first hash value and a difficulty target. The first hash value is a hash of the block header of the current ML block concatenated with an r value. The PoW r-puzzle is configured to take, as an input from a chain input of the next ML block, a block header of the next ML block and a signature. The PoW r-puzzle is configured to extract the r value from the signature, combine (e.g. concatenate) the extracted r-value with the block header of the next ML block, and generate a second hash value by hashing the combined r value and block header. The Pow puzzle is also configured to check that a hash of the combination (e.g. concatenation) of the first and second hash values meets the difficulty target.

Alternative methods for chaining the ML blocks may be used. For instance, a given chain output of an ML block may be locked to a public key associated with a particular ML block producer, e.g. using a pay-to-public-key-hash (P2PKH) locking script. The public key may correspond to a threshold private key, requiring a plurality of ML block producers 501 to contribute in order to append a new ML block to the chain. Or, a given chain output of an ML block may comprise a multi-signature locking script locked to one or more of a set of public keys.

Each chain output may implement the same locking mechanism, i.e. a particular type of locking mechanism which differs only in the specific data but not in the format or function of the locking script. For example, each chain output may comprise a locking script configured to implement the same consensus mechanism, such as a PoW puzzle. Each PoW puzzle is unique in the sense that at least some of the data (e.g. hash of the previous block header, and the current block header) is specific to a given ML block, but the format of the locking script (e.g. the opcodes) is the same. As another example, in the case of a P2PKH locking script, the format is the same but the public key hash included in each locking script will be different.

In practice, the ML block producer is likely to be a node of the core network. However, in at least some embodiments the ML block producer may be an SPV client or a user. SPV clients and users may have less capabilities compared to a blockchain node, e.g. not being able to submit core blocks to the core network, or validate core transactions (ML blocks) according to the core chain protocol as they would need access to the UTXO set for this. So in these embodiments, SPV clients would need a method of regularly checking the UTXO set of the core blockchain so as to validate core transactions. The SPV client may have a communication channel with a node for this purpose. In some examples, it is not necessary for the SPV client to validate the transactions, as the transactions will be validated by a core node and rejected if invalid.

If the ML block producer is a user e.g., Alice, she would not need access to the UTXO set but instead a way to identify the tip of the UTXO chain (i.e. the ML data chain) that is relevant to the secondary data chain (e.g. a particular application). This may be performed by querying the UTXO set or communicating with any other authorised users for that chain, or a core node.

The ML block producer may preferably be able to identify the UTXO chain tip, i.e. the most recent valid ML block. If it is locked to a single P2PKH this is easy as the user knows no one else could have authorised a core transaction in the UTXO chain. This is also straightforward for nodes because they have a full copy of the blockchain history (which includes a mempool and UTXO set). However, for an SPV client performing PoW, or in situations where one party or a subgroup within a larger group can authorise a core transaction, the SPV client may need to be aware of the UTXO chain tip and any missing preceding ML blocks, e.g. if the client has been offline and has not received those ML blocks. The SPV client may request the most recent ML block(s) from a node.

7. Example Multi-Level Blockchain Protocol

An example protocol for implementing the described embodiments will now be described. It will be appreciated that some of the following features are optional.

7.1 Multi-Level Transaction

A multi-level transaction (MLT) is a core transaction in which data of one or more transactions on the secondary chain is embedded. They are designed to transmit secondary chain transaction data from users to multi-level (ML) nodes via the core network infrastructure. As a result, there is no need to set up a new network or authenticated channels for the ML protocol. MLTs have three main requirements:

1. to carry secondary chain transaction data in a format that is accepted by the core network,
2. are deemed as 'non-final' to deter standard nodes from publishing MLTs directly in a core block, and
3. can be combined with other MLTs in the construction of a 'finalised' core transaction.

7.2 Embedding Secondary Chain Transactions

To broadcast a transaction to the secondary network, a user first creates and signs the secondary chain transaction. This transaction data is then serialised before it is embedded in an MLT. The structure of the embedded transaction and the protocol for serialisation will differ depending on the protocol of the secondary blockchain. For example, a UTXO-based secondary blockchain can follow the serialisation format described above in section 6.5.

7.3 MLT Structure

The first MLT requirement of carrying data via the core network infrastructure is satisfied by adhering to the standard core blockchain transaction format. MLTs contain one (or more) carrier pairs—an input and output in matching index positions, with an OP_RETURN in the locking script of the output. The OP_RETURN contains the serialised data from a single embedded transaction. Carrier pairs are designed so that the input and output on the core chain are independent from the secondary data that is embedded in the output. Any core chain UTXO can be used as the input of a carrier pair, and the output can later be spent in any subsequent core chain transaction.

FIG. 10 shows a MLT that contains a single carrier pair. The nSequence and locktime values for MLTs are set to their defaults. The other fields have the following properties:

Version Non-standard value. Acts as a flag for the ML protocol.

Input Outpoint—can specify any valid UTXO belonging to the user on the core chain.

Unlocking script—contains the user's public key and their signature with flag SINGLE|ANYONECAN-PAY (S|ACP).

Output: Value—equal to the value of the input.

Locking script—assigns the UTXO to a new core chain public key belonging to the user. Contains OP_RE-TURN followed by the embedded transaction data.

Here it is assumed that all users creating transactions on the secondary chain also control UTXOs on the core chain and can therefore create their own carrier pairs. Alternative scenarios are explored below.

7.4 Version Number

MLTs use a non-standard transaction version number as a flag for the ML protocol. A non-standard version number does not render a transaction invalid based on the consensus rules of the core blockchain network, rather it provides additional functionality to the transaction determined by the protocol associated with a version number. Nodes that update their policy document for a given version number indicate that they interpret this added functionality. While standard nodes process MLTs as they would a standard Bitcoin transaction, ML nodes process transactions flagged with the correct version number according to the rules laid out by the ML protocol. The version flag also provides a straightforward way to query the core blockchain for embedded data.

7.5 Transaction Fee

The second MLT requirement in which MLTs are deemed as non-final can be satisfied by omitting the transaction fee required to process the transaction for publication on-chain. Removing the transaction fee may be sufficient to ensure MLTs are not published by standard nodes. In some scenarios, an alternative mechanism may be required to prevent individual MLTs from being published to the core chain; this is explored below. Note that the use of carrier pairs with no transaction fee means that the user does not lose any value (since the output UTXO is equal to the input value) should the MLT be inadvertently published to the core blockchain. In this case, a new MLT can be issued to carry the same embedded data at no extra cost.

7.6 Signature

Each carrier pair in the MLT is signed by the user before it is sent to ML nodes. The signature authorises the spend of the input UTXO on the core blockchain while locking the details of the output, namely the MLT's value, the output address and the embedded transaction data.

The third MLT requirement that involves being able to combine MLTs into a finalised Bitcoin transaction (to represent a secondary block of data) is satisfied by signing all constituent carrier pairs using S|ACP. This sighash flag allows carrier pairs to be extracted or copied from MLTs and combined into a larger transaction without invalidating any of the signatures provided by users.

7.7 Multi-Level Block

A multi-level block (MLB) is a single transaction on the core blockchain in which an entire secondary chain block is embedded. ML nodes receive MLTs from different users and combine their constituent carrier pairs into a candidate MLB. A finalised MLB also contains secondary block metadata that is generated and embedded by ML nodes, and which must satisfy the consensus mechanism of the secondary blockchain.

7.8 Multi-Level Nodes

ML nodes may be a subset of nodes operating in the core network. ML nodes may update their policy to identify themselves as part of the ML protocol and act as 'specialised' nodes in the core network. This allows peers in the secondary network to identify and establish direct connections with one another, as well as allowing users to identify nodes to whom they can broadcast their MLTs.

All nodes in the core network perform key functions such as maintaining a copy of the core blockchain, mempool and UTXO set, and competing with their peers to generate new blocks on top of the core blockchain. ML nodes perform an additional set of roles that relate to the secondary blockchain in parallel to their responsibilities as a core blockchain node. These are to:

1. Maintain the following datasets:
   the secondary blockchain database,
   a mempool of carrier pairs from MLTs, and
   transaction-relevant data for the secondary chain.
2. Collect MLTs that are broadcast by users to the secondary network and check their validity according to both core and secondary blockchain protocols.
3. Forward valid MLTs to their peers in the secondary network.
4. Generate candidate MLBs by:
   incorporating valid carrier pairs as they are received, and
   creating and updating a Merkle Tree and other metainformation based on the list of secondary chain transactions embedded within the candidate MLB.
5. Compete and/or collaborate with other ML nodes to satisfy the consensus mechanism of the secondary blockchain.

The mempool of ML transactions is not necessarily distinct to the mempool the ML node holds for the core blockchain. The transaction version number allows ML nodes to identify which protocol to follow when validating transactions in their mempool without needing to create two separate databases.

7.9 Multi-Level Verification

MLTs may be verified according to the rules laid out by both core and secondary blockchain protocols; a process referred to as multi-level verification (MLV). These checks are independent of one another and can be performed in parallel. One aspect of the verification process is governed by the rules of the core blockchain's protocol i.e., Bitcoin's validation rules. Each carrier pair within a MLT is verified by checking that:

a valid UTXO in the UTXO set of the core network is referenced in the outpoint, a valid unlocking script has been applied in the input to unlock the referenced UTXO, and the value of the input is at least equal to the value of the output.

The other aspect of verification is to check the validity of the serialised data within the carrier pairs for each embedded transaction. These checks depend on the rules of the secondary chain. Only MLTs that are valid according to both secondary and core blockchain rules are included in MLBs.

7.10 MLB Structure

MLBs are formed from a series of input-output pairs as illustrated in FIG. 11. Each pair carries a separate unit of information with respect to the secondary chain block embedded in an OP_RETURN. ML nodes create the carrier pairs for index 0 (shown with light shading) and index 1, which will contain the secondary chain block metadata and where relevant, an embedded transaction to allocate the secondary chain block reward. Index 2 onwards (shown with dark shading) contain carrier pairs that are copied from MLTs sent by users.

The input and output at index 0 carry the block header data of the secondary chain. The UTXO used as the input has dust value, and the output reassigns the same value to a new UTXO. By chaining the UTXOs in index 0 in this manner, the block headers from the secondary chain are stored within the transaction history of a single UTXO on the core chain. Note that the block header UTXOs must be spendable by any ML node. Here this is achieved using a puzzle in the locking script for the block header UTXOs, rather than locking the output to a specific public key. The puzzle is set so that the solution requires the ML node to have satisfied the consensus mechanism for the secondary chain.

The input and output at index 1 serve three purposes:

supply the transaction fee necessary to meet the requirements of the core chain, allocate any block reward on the secondary chain, and sign using sighash ALL to ensure the integrity of the MLB.

The input is a core UTXO controlled by the ML node that holds sufficient value to cover the transaction fee at the rate dictated by the core chain. In this model, ML nodes expend a small amount to cover the fee on the core chain. For secondary blockchain protocols that incentivise ML nodes through block rewards and/or transaction fees, the core chain transaction fee should be offset (and exceeded) by the total reward allocated to the ML node from the secondary chain block. Other secondary blockchain protocols may be willing to incur a small fee because of the benefits the ML protocol can provide in terms of the storage and immutability of their blockchain data, amongst others.

The output of index 1 assigns the change remaining from the input to an address (PK1) belonging to the ML node. For secondary blockchains where there is a reward allocated to ML nodes on the publication of a block (e.g., the coinbase transaction in Bitcoin), the serialised data of the reward transaction is also embedded in the OP_RETURN of index 1 output.

The signature provided to validate the input uses sighash ALL so that the signature message includes the details of all inputs and all outputs i.e., carrier pairs in the MLB. This ensures that once the MLB is signed by the ML node, the details of the MLB transaction and candidate secondary block cannot be changed without invalidating the signature at index 1.

Index 2 onwards contain the carrier pairs broadcast by users in the MLTs. Since users sign their carrier pairs with the S|ACP flag, ML nodes can copy carrier pairs directly from MLTs into a candidate MLB transaction. Provided the details of each carrier pair (input, output, OP_RETURN data and signature), and other transaction information included in the signature message (version number, locktime) remain unchanged, then any carrier pair remains valid in any core blockchain transaction. As a result, carrier pairs are simultaneously valid in all candidate MLBs. This mirrors the traditional construction of core blockchain blocks from similar sets of transactions stored in each node's local mempool.

7.11 Consensus Mechanism

In many blockchain systems, block producers compete to win a candidate block. The outcome of the competition is determined according to the consensus mechanism of the blockchain. Examples of consensus mechanisms include:

Proof of Work (PoW), where the probability of winning a block is proportional to the computational resources committed by a block producer.

Proof of Stake, a weighted decision process based on a block producer's current holdings or seniority within the network.

Proof of Authority, where a set of block producers are certified and trusted.

Voting between nodes.

The secondary blockchain may follow the same or a different consensus mechanism to the core blockchain. ML nodes make independent efforts to satisfy the consensus mechanisms for the core and secondary blockchains.

7.12 Enforcing Consensus Mechanism In-Script

Some consensus mechanisms can be represented as a cryptographic condition in Bitcoin's native script language. For example, the PoW system used in the Bitcoin blockchain requires block producers to solve a hash puzzle: they must find a candidate block where the hash of the block header is below a certain value (the difficulty target, D). This type of hash puzzle can be represented in-script as follows:

$$< BlockHeader > \text{OP\_SHA256} < D > \text{OP\_LESSTHAN}$$

A similar script can be used to chain the UTXOs at index 0 of consecutive MLBs (see FIG. 11). For each MLB, input 0 references outpoint 0 from the previous MLB. This previous outpoint has a locking script that contains a hash puzzle based on the previous secondary chain block header. In order to validate the spend of that UTXO the ML node must provide a value that is based on their current secondary chain block header and satisfies the hash puzzle from the previous MLB.

The following conditions in index 0 of each candidate $MLB_h$ (created at height h) ensure the validity of the UTXO chain:

1. Outpoint references the UTXO generated at index 0 of the previous MLB, $MLB_{h-1}$.

2. Unlocking script is set to the hash of the current secondary chain block header:

$<H(BlockHeader_h)>$

3. Output sets the new locking script:

$<H(BlockHeader_h)>$OP_CAT OP_SHA256$<D>$OP_LESSTHAN where D is the current difficulty target of the secondary chain.

With these conditions, when validating index 0 of $MLB_h$, the unlocking script is concatenated with the locking script of index 0 of $MLB_{h-1}$, giving:

$$< H(BlockHeader_h) > \; < H(BlockHeader_{h-1}) >$$

$$\text{OP\_CAT OP\_SHA256} < D > \text{OP\_LESSTHAN}$$

This combined script will be evaluated as true if:

$$H(H(BlockHeader_h) \parallel H(BlockHeader_{h-1})) < D$$

An example of the hash puzzle implementation is given in section 8.

In the PoW system for Bitcoin, for example, only the current block header is included explicitly in the validity condition. However, the relationship to the previous block is implicitly enforced because each block header contains the hash of the previous block header. In the ML protocol, the hash puzzle that builds the chain between neighbouring blocks also serves as a locking script for a UTXO. It is important to have a unique value as part of each locking script puzzle, otherwise any value that is known to have a hash below the difficulty target can be used to spend the UTXO. All previous block headers where the same—or a harder—difficulty target was in use will have this property, and a malicious actor could use any of these to spend the UTXO, breaking the UTXO chain. To resolve this vulnerability, the ML protocol explicitly includes the value of the most recent secondary chain block header in each locking script. This value is unpredictable and ensures a solution can only be found by applying hash power.

The difficulty target is set according to the secondary blockchain rules and may be varied according to the combined hash power being invested into secondary block production. Note that the in-script puzzle above requires two hash operations for each iteration of the PoW calculations: the current (secondary chain) block header must be hashed, concatenated with a fixed value, $H(BlockHeader_{h-1})$, and hashed a second time. The first hash is not strictly necessary, but it reduces the size of the unlocking script and therefore the MLB transaction fee. If this extra hash operation is used, the secondary chain difficulty target can also be adjusted to compensate.

7.13 Validating Candidate MLBs

In addition to the requirements that are specific to the secondary chain consensus, candidate MLBs must also satisfy additional conditions of validity within the ML protocol:

- all carrier pairs in index 2+ are valid based on the MLV rules,
- block header and coinbase transaction are correctly formatted according to the secondary chain protocol, and
- the MLB provides a sufficient transaction fee based on the rules of the core network.

The validation of MLBs is performed by peer nodes in the secondary network and should occur before the MLB is made available to standard Bitcoin nodes. This is because once a MLB is published on the core chain, the UTXOs in the carrier pairs are irrevocably spent. To ensure that the candidate MLB is not published on the core chain before it has been validated, ML nodes may initially withhold their signature for index 1. This renders the transaction invalid to standard core nodes, but under the ML protocol the missing signature signals to ML nodes that the MLB requires verification. The signature will be added after the MLB has been approved by peers. When a peer receives a candidate MLB, they run the validation checks. If the MLB is valid, they:

- notify all peers in the secondary network that the candidate MLB is valid,
- update their mempool by removing any MLTs whose carrier pairs were included in the MLB, and
- begin constructing a new candidate MLB on top of the valid MLB. Note that withholding the signature for index 1 does not delay ML nodes from building a new candidate secondary chain block on top of an approved MLB, since the current secondary chain block is already finalised and the index 0 output has already been set.

7.14 Publishing the MLB on the Core Chain

The candidate MLB is finalised by the winning ML node by adding the final signature and broadcasting to the core network. The MLB will be treated as a regular transaction by all nodes and included in a candidate block for the core chain.

There may be a short delay between ML nodes reaching consensus and the winning MLB being published in the core chain due to the variable block production time of both secondary and core networks. As a result, there may not necessarily be a 1:1 mapping between blocks produced on the secondary chain and blocks published on the core chain. This is not problematic since each MLB contains a different block of embedded transactions, and the core chain transaction IDs of each MLB is unique. Therefore, if two or more MLBs are published within the same block on the core chain, each secondary chain block has its own unique identifier (block, TxID) on the core chain.

In situations where two MLBs are produced at similar times, a traditional blockchain might see a temporary chain split and would need to accommodate re-orgs. In the ML protocol, we can rely on the core network to resolve any conflicts: if two versions of the MLB at a given height in the secondary chain are sent to the core network, only one will be published. This is because the two MLBs contain the same UTXOs (from the carrier pairs in their parent MLTs) and so standard core nodes will only include one MLB in their candidate blocks. Whichever MLB is included in the winning block on the core blockchain is the de facto winner on the secondary chain.

7.15 Error Corrections: Reissuing Secondary Chain Transactions

It is possible that an invalid MLB is erroneously sent to the core blockchain, or that a MLT is published in its own right on the core chain before it has been included in a MLB. In these situations, the UTXOs used as inputs for the carrier pairs are no longer valid, as they have been spent on the core network, but the embedded transactions they carry have not been included in a valid MLB and are therefore not part of the secondary blockchain. To remedy such errors, ML nodes can 'reissue' the embedded transactions by creating and signing replacement carrier pairs (using UTXOs they control) and copying the embedded transaction information from the original data outputs in the MLTs that were prematurely spent. Since the values of the input and output are matched for all carrier pairs, the ML node invests no more coin than in a standard MLB. Although in this scenario users no longer apply their own signatures to the UTXO input of their carrier transaction, the secondary chain transaction data is still protected against modification due to the signature(s) applied within the embedded transaction.

7.16 Example Flow

Figure 12:
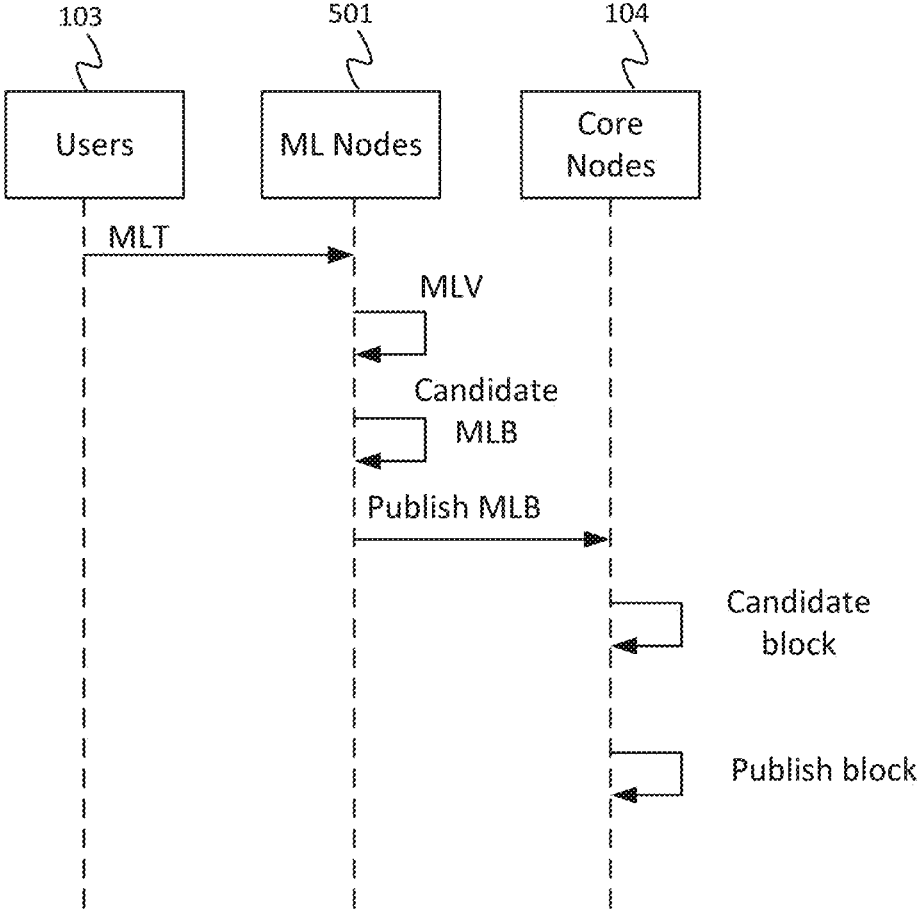
FIG. 12 is a sequence diagram showing an example set of the steps in the ML protocol.

FIG. 12 shows a sequence diagram of the steps in the ML protocol, which correspond to the 11 steps below; steps 1 to 8 are executed within the secondary network (i.e., by ML nodes), while steps 9 to 11 are performed in the core network (i.e., by both ML and standard core nodes).

1. Users construct one or more carrier pairs each containing an embedded transaction.
2. Users broadcast MLTs containing carrier pairs to ML nodes.
3. ML nodes forward the incoming MLTs to their peers in the secondary network.
4. ML nodes carry out the MLV process to validate each carrier pair and its embedded transaction.
    i. If the MLV process fails, the carrier pair is discarded.
5. ML nodes construct a candidate MLB.
6. Candidate MLBs are broadcast to peers in the secondary network.
7. Peers in the secondary network verify candidate MLBs in the order they are received.
    i. If verification fails, ML nodes continue constructing their candidate MLB (step 5).
    ii. If a candidate MLB is valid, ML nodes notify all peers, update their mempool, and construct a new candidate MLB on top of the approved MLB.
8. The winning ML node finalises the candidate MLB by providing the signature for index 1 and broadcasts the MLB to the core network.
9. Nodes in the core network construct a candidate block (that contains the MLB as a regular transaction) according to the core consensus rules.
10. The winning candidate block (core chain) is broadcast to peers in the core network.
11. The winning block containing the MLB carrier transaction is verified by peers in the core network; the embedded secondary chain block is published on the core chain.

Once published on the core chain, the MLB provides a public, immutable record of the secondary blockchain data. Each block embedded from the secondary chain has a unique identifier on the core chain; the block height and TxID of the MLB that contains the embedded block. Similarly, each embedded transaction can also be uniquely identified on the core chain by the block height, TxID and index value. The fact that the data for each embedded transaction is contained within a dedicated OP_RETURN should allow for efficient querying of secondary chain transaction data.

While the secondary blockchain follows its own protocol, the ML protocol provides an opportunity for the secondary chain to benefit from some features attributed to the core blockchain. Some examples of such features are:

Miner ID—native to the Bitcoin SV network, miner ID can allow users of the secondary chain to identify which ML node was responsible for publishing a particular MLB. ML nodes could include their miner ID in the MLB as part of the secondary chain block header. For a secondary chain following the Bitcoin protocol, this information could be included in the coinbase script of the embedded coinbase transaction.

Block cap—some blockchains may have a limit on the size of each block. ML nodes may therefore choose transactions with higher transaction fee rates to maximise their block reward. For a core blockchain based on the Bitcoin SV protocol, there are no restrictions on block size. Arbiters of the secondary blockchain consensus rules can make use of the characteristics of the core blockchain and update their consensus for larger block sizes.

Private blockchains—the security of private blockchains that operate within a closed network can be bolstered by publishing commitments of transactions or blocks on the core public ledger, creating a public immutable record of the private data e.g., for auditing purposes. The embedded data could be encoded or hashed in order to maintain privacy.

7.17 Multi-Level Protocol Variants 7.17.1 Users Send Secondary Chain Transactions Directly to ML Nodes In some cases, users in the secondary network may not control any UTXOs on the core chain or may not wish to generate and sign a second (core) transaction on top of their secondary chain transaction. To accommodate this, ML nodes can offer to generate and sign carrier pairs as a service on behalf of users. In this case, users send their secondary chain transactions directly to a ML node via a separate messaging channel. The transaction data cannot be modified since it has been signed by the user according to the secondary chain protocol.

ML nodes embed the secondary chain transaction in a MLT (generating a carrier pair using a UTXO they control) and sign the carrier pair using a S|ACP flag. As in the original protocol, the signature that authorises the carrier pair is independent from signatures within the embedded transaction, and here they are provided by different parties. ML nodes forward the signed MLTs to their peers in the secondary network to ensure the embedded transactions will be included in all candidate MLBs.

While this system provides a service for users that do not control UTXOs on the core network, users cannot broadcast secondary chain transaction data to ML nodes via carrier pairs (i.e. the can no longer piggyback off the existing core network infrastructure). Instead, they must communicate directly with a ML node via a separate communication channel or network. This may require an extra stage of authentication between the user and the ML node, and the user must trust the ML node to convey their secondary chain transaction to the rest of the secondary network (via a MLT).

7.17.2 Reducing the Size of Embedded Data

In the base ML protocol, the data is embedded in its raw serialised form. This means that MLBs may contain a large volume of data, incurring large transaction fees on the core network, and placing a heavy burden on data storage within the core network. An alternative is that secondary chain transaction data is hashed before it is embedded in a carrier pair, so that only a fingerprint of the secondary chain is recorded on the core chain. Note that if only a hash of secondary chain data is embedded, users may also submit the preimage of the hashed transaction in each carrier pair to ML nodes so that they can verify the embedded transactions. While the hashing method reduces the burden of storage on the core chain, there is a trade-off in ease of data retrieval since secondary chain data can no longer be read directly from the core chain database. Instead, ML nodes are responsible for storing and maintaining the full secondary blockchain database. To prove the integrity of the secondary blockchain, the full data stored by the ML nodes must be combined with the commitment that exists on the core blockchain.

Since the raw data in these examples is stored in a separate secondary blockchain database, it may not be necessary to have a unique commitment on the core chain for each embedded transaction. For example, a Merkle root that represents the entire secondary chain block can be combined with Merkle proofs to provide an integrity proof for each transaction. Nodes who maintain the full secondary blockchain database will be able to provide the required Merkle proof and this can be verified against the Merkle root of the embedded in the core chain.

In these cases, ML nodes can embed a full secondary chain block within a single OP_RETURN. Note that with this design, carrier pairs are no longer an integral part of the final MLB. Carrier pairs may still be generated by users to transmit their secondary chain transactions to ML nodes via the core network infrastructure. However, an alternative network or messaging system (for example within a private network) could be used to send the secondary chain transaction data to ML nodes.

This protocol variant may be beneficial in cases where the secondary blockchain existed prior to it being embedded in the core chain. ML nodes may wish to include a commitment of the historical ledger in a transaction on the core chain at the time of transfer to the ML protocol. This would provide an immutable record of the previous transactions in the secondary blockchain for verification purposes. All historical transactions from the secondary blockchain database (or a commitment of reduced size) could be embedded in a single transaction on the core blockchain in one null data output (OP_FALSE OP_RETURN).

7.17.3 Threshold Consensus Mechanism

As an alternative to the hash puzzle consensus mechanisms described above, the UTXO chain that is formed from the inputs and outputs of MLBs at index 0 may instead be locked to a private key that is part of a threshold scheme and for which parties acting as ML nodes hold a share. To validate the UTXO (and thus the MLB), a threshold number of nodes who hold key shares must agree that the MLB is valid. Assuming the ML node who submits their candidate MLB for peer approval provides their signature share, then a 2-of-n threshold scheme would require the approval of one authorised peer in the secondary network for the block to be valid. Schemes with higher thresholds would require the approval of more than one peer to validate a MLB.

One obstacle to implementing this variant is that it may be difficult to predict the set of ML nodes who are active at any given time. Threshold schemes typically rely on having a fixed set of parties who hold key shares whereby a threshold number are available at any one time to produce a valid signature. However, it has recently been shown that updating shares and adding or removing shareholders in threshold signature schemes is feasible without altering the underlying private key. It may therefore be possible to design a threshold scheme that has the flexibility to cater for some variation in the sets of active ML nodes by regularly updating shares.

7.17.4 Delayed Broadcast of MLBs to the Core Network

Once a MLB is published on the core blockchain, the UTXOs of all the carrier pairs it contains are irrevocably spent. It is therefore important that MLBs are not sent to the core network before they have been validated. The original ML protocol required that at least one peer in the secondary network attests that a candidate MLB is valid before it is sent to the core network.

An alternative error prevention technique is to delay sending MLBs to the core network until the secondary network has built a threshold number of secondary chain blocks on top. This variant may prove particularly useful in situations where the secondary blockchain has a different block production time to that of the core network, for example a very short block production period, where multiple secondary chain blocks are expected to be published in each core block.

Validated MLBs can be stored in memory by nodes in the secondary network for a certain period before they are broadcast to the core network. These MLBs would form a blockpool, analogous to the mempool of transactions that are yet to be published in a standard blockchain. Each ML node would maintain their own blockpool locally and include MLBs produced by other ML nodes once they have been validated.

7.17.5 Blockpool Protocol

Consider a block at height h in the secondary chain. Once ML nodes validate a block at height h+c, the block at height h is considered to have c confirmations. At a threshold value of c, the secondary network broadcasts the confirmed MLB of height h to the core network and removes it from the blockpool. Subsequent blocks in the chain (i.e., h+1 . . . h+r for r<c) remain in the blockpool until they have received the requisite c confirmations.

Let us assume that the blockpool starts off empty. The protocol below describes the MLB validation and blockpool process as MLBs are received from peers. The notation $Z_{YX}$ denotes a MLB, Z that is built upon MLB Y, which in turn is built on X and so on. This example is designed to cover all possible scenarios (e.g., a multi-block split in the secondary blockchain), but it is appreciated that the likelihood of this happening is extremely low.

Figure 19:
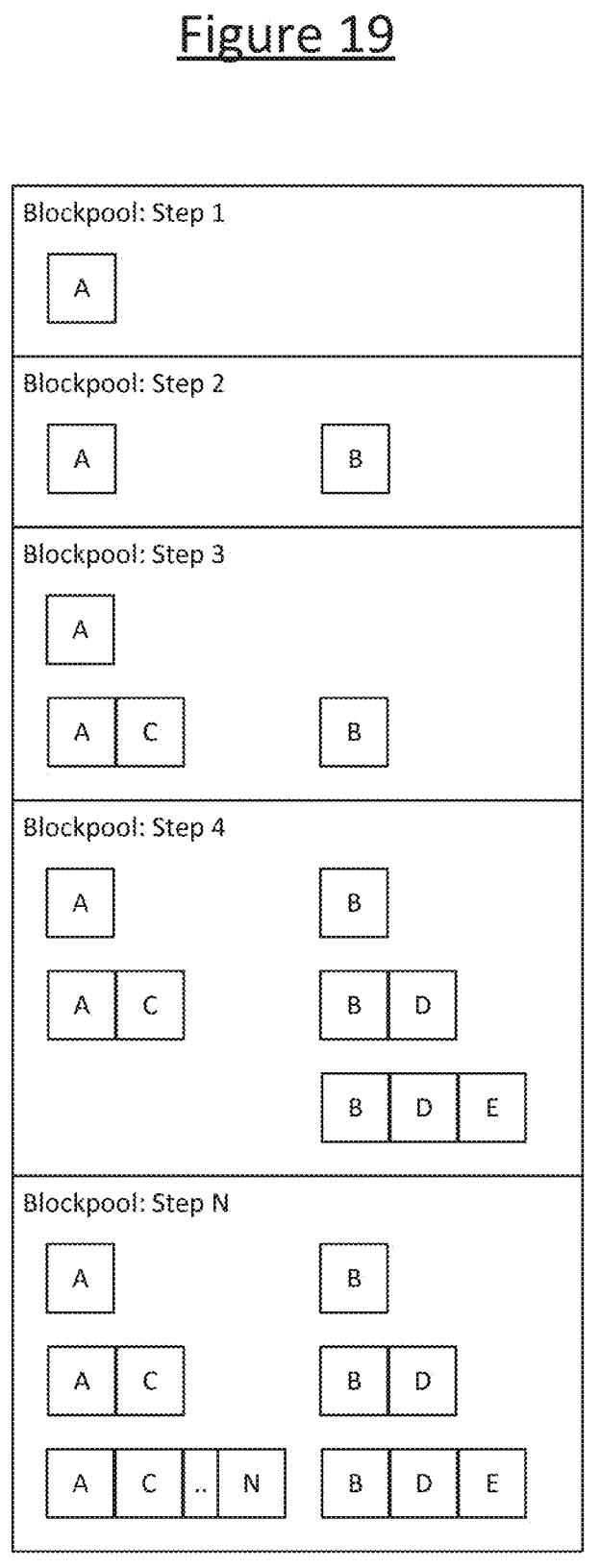

FIG. 19 illustrates the contents of the blockpool of a particular ML node, P, at different stages.

1. P receives MLB A. If valid according to the secondary blockchain rules:
   P places A in their blockpool,
   updates their mempool to remove carrier pairs contained in A, and
   works to build a new candidate MLB on top of A.
2. P receives MLB B of same height as A.
   P stores B in case the chain on B is built faster than on A, but
   does not validate B until it becomes part of the longest valid chain.
3. P completes block $C_A$ and sends to peers.
   P places $C_A$ in their blockpool,
   updates their mempool, and
   works to build a new MLB on top of $C_A$.
4. P receives block $E_{DB}$.
   P requests $D_B$, as not currently known.
   P verifies B, $D_B$ and $E_{DB}$. If all are valid:
   P places B, $D_B$ and $E_{DB}$ in blockpool,
   updates their mempool, and
   works to build a new MLB on top of $E_{DB}$.
. . .

N. P receives block $N_{. . . A}$ with relative height c. If valid:
   P broadcasts A to core network,
   removes any competing blocks at same height as A (i.e. B) and all the associated child blocks ($D_B$ and $E_{DB}$) from their blockpool,
   updates their mempool, and
   works to build a new MLB on top of N.

7.17.6 Ensuring MLTs are Not Published Prematurely to the Core Chain

The original ML protocol relies on the fact that currently nodes in the core network have a minimum transaction fee rate for transactions to be included in the core blockchain. By setting the fee in all MLTs to zero, we remove any economic incentive for standard core nodes to include MLTs in their blocks. However, if standard core nodes change their policy to include zero-fee transactions in their blocks, an extra measure can be taken to intentionally invalidate MLTs before they are broadcast to the network.

For example, we may include a flag as the first byte of the OP_RETURN data that is set to 1 prior to signature generation and edited to 0 after the signature has been applied. This actively invalidates the signature so that standard core nodes will consider the MLT to be invalid. However, based on the ML protocol and the version number, ML nodes would know that the first byte of the OP_RETURN must be returned to 1 before signature validation is performed. Any equivalent process of an intentional violation of validity (and subsequent correction) of MLTs would serve the same purpose as this example.

7.17.7 Network Structure: SPV Clients on Core Network

In the base protocol we assumed that ML nodes are a subset of the nodes operating in the core network. ML nodes alter their policy so that they process transactions that have the ML protocol version flag according to a different set of rules to regular (non-versioned) transactions in the core network. They perform roles as block producers for the secondary and core networks in parallel.

An alternative is that ML nodes are SPV clients in the core network, such that they are full nodes (act as block producers) exclusively in the secondary network. One obstacle to this variant is that ML nodes are required to perform the MLV process, during which they must verify that the UTXOs used as inputs in carrier pairs exist within the current UTXO set of the core blockchain. This verification step is vital so that an invalid UTXO is not included in candidate MLBs, since the resources expended by ML nodes to produce a valid block would be wasted if the MLB is rejected by the core network. If ML nodes are only SPV clients on the core chain, they would not have the full core blockchain database that is required to perform these UTXO set checks. One solution is for ML nodes to employ a service which provides UTXO commitments i.e., can supply verified, up-to-date copies of the UTXO set of the core chain.

7.17.8 Embedding Generic Data on the Core Blockchain

The ML protocol illustrates a system to embed a secondary blockchain within a core chain and link the transactions that carry the secondary chain blocks via a chain of UTXOs on the core blockchain. However, the embedded data can in fact take any format. Here we consider other use cases where data is embedded within a chain of transactions on a public blockchain. Note that the system provides two levels of granularity: the transactions within a UTXO chain, and the carrier pairs (with OP_RETURN data) within each transaction.

Due to the unlimited block size on the Bitcoin SV blockchain, there is almost no restriction on the amount of data that could be stored in this manner. Similarly, since the OP_RETURN code can hold any data that can be serialised into a string, there is little restriction on the type of data that can be stored. It is possible for the data to be encrypted for privacy, or for a cryptographic commitment (e.g., a hash of the data) to be embedded in place of the raw data, so that the core blockchain can be used to provide proof of data immutability.

There are two means of identifying a set of embedded data from within the core chain database: transaction version, or a specific UTXO chain. Either identifier can be used by external or overlay systems to isolate specific transactions and access the embedded data from the core blockchain. The transaction version is highly flexible and may be appropriate for general categorisation of data carrier transactions within the blockchain. However, since other parties are free to assign the same version number to their own transactions, transaction version numbers do not act as secure, exclusive identifiers. On the other hand, the UTXO chain provides more precise control over which parties have the power to add data to a certain chain, based on the spending conditions in each UTXO locking script.

7.17.9 Consolidating Layer 2 Application Data Based on Transaction Version Number As the blockchain scales it is likely that nodes will move towards maintaining a size-reduced version of the blockchain database. For example, by purging transactions that contain large data payloads, and retaining only the block header data that is associated with those transactions. In these cases, blockchain applications that regularly store data on-chain may partner with particular nodes or servers to ensure that a full copy of their transaction data is maintained within the network. In these cases, proof that a transaction is part of the blockchain requires both the original transaction data and a Merkle proof; these can be checked against the Merkle root of the block, which would be stored by all nodes. Transactions relating to a specific application can be flagged based on transaction version. While this allows for easy identification of relevant transactions, those transactions may be fragmented throughout the wider blockchain. Since a Merkle proof must be stored for each transaction, applications that generate large volumes of microtransactions (via social network sites, game servers or token systems) may result in substantial storage requirements for both the data and the Merkle proofs. To address this, applications can use a version of the MLB protocol to collate multiple user transactions together into a single 'block' transaction, so that a single Merkle proof can be stored to represent a bulk of the microtransactions.

In this system, users would sign a carrier pair (using S|ACP) and the OP_RETURN would contain application-related data rather than secondary chain transactions. In contrast to the ML protocol, where carrier pair inputs and outputs have the same value, here carrier pair values can be adjusted so that the output is lower than the input to allow the application provider to collect service fees from users as they generate blocks. Note that since this relies on users signing carrier pairs that leave some value unassigned, it is vital to have a direct communication channel from users to service providers, so that the fee is not collected by an interceptor. In cases where secure channels are not possible, the application providers may choose to accept zero-fee carrier pairs and fund the block themselves, based on the benefits provided by a large, consolidated block of transactions. Whether the fee is contributed by users or service providers, consolidating microtransactions into a block also offers a small saving in the transaction fee relative to if each microtransaction were broadcast individually.

7.17.10 UTXO Chain Enforcement: Locking Scripts

Creating a UTXO chain allows for greater control and security for a set of embedded data transactions relative to transactions flagged by their version number. A UTXO chain is protected by the locking scripts defined when each UTXO in the chain is generated, and these scripts can be used to control the parties who have authorisation rights to add new data transactions to the set. For example:

P2PKH: each new UTXO in the chain is locked to a specific public key so that only the person with the associated private key can create the next linked transaction.

Multi-signature: a multi-signature spending condition with a 1-of-n requirement allows a valid signature to be created by any one of the n private keys that correspond to the list of public keys. This means a group of approved parties can be established, any one of whom may add a new linked transaction to the UTXO chain.

Threshold Signatures: all UTXOs in the chain could be locked to the public key associated with a threshold scheme, where a set number of parties within the group are required to agree to sign in order to produce a new linked transaction.

Hash puzzle: a hash puzzle requires an input, which when hashed is below a certain target. This can be solved in a brute force manner but requires a substantial investment of hash power to solve, effecting a PoW requirement for generating a new linked transaction.

Hash/HMAC preimage: a spending condition that applies a non-invertible cryptographic function (e.g., hash or HMAC) and requires that the solution is an exact value. Unlike the hash puzzle described above, this cannot be brute forced, so only a party who already knows the associated pre-image can spend the UTXO. A new pair (comprised of the preimage and output value) must be created each time a new UTXO is generated, and the preimage shared with all parties who are authorised to append to the chain. Alternatively, a series of preimages and associated outputs can be generated in advance and distributed to all authorised parties. This solution is functionally similar to the multi-signature condition, in that any one of a set of authorised parties may add to the UTXO chain and may offer lower transaction fees as there is no need to include a list of all valid public keys in each locking script.

7.17.11 Ordered Data

Another aspect of the UTXO chain is that it provides a fixed ordering for data stored in subsequent transactions within the chain. This is fundamental to the core blockchain model, where each block is built upon the previous one, but is a feature that is applicable to many other datasets, for instance financial accounts, iterations of documents or code, email or message chains, moves in a turn-based game, etc.

In the main ML protocol, the set of blocks within the secondary chain is ordered with a hash chain between block headers, but the transactions within the secondary chain blocks are not necessarily in a set order. Each S|ACP signed carrier pair is equally valid in all index positions within the MLB transaction. However, if desired, it is possible to enforce an ordering at the level of the carrier pairs as well as between transactions. One way to do this is to include the hash of the data that is embedded in the first index position (or alternatively a hash of the signature, or the whole carrier pair) at the beginning of the data embedded in the second index position, and so on. This proves that the data in the previous index position was known at the time of signing the current index position. Using this method, a multi-level ordered dataset can be generated and stored on the core blockchain.

For example, in a turn-based game, player A moves first. They place the details of their move in the OP_RETURN of a carrier pair, and sign using S|ACP. The carrier pair is sent to a trusted game server (who plays the role of block producer). The server calculates the hash of the first move carrier pair and sends this to player B. Player B generates a carrier pair that includes the hash of player A's move, and the details of their own move in the OP_RETURN; this is signed and sent to the game server. Once the game is finished, the 'block' that contains all the game moves in order is published to the blockchain to provide immutable proof to both players that their moves occurred in the correct sequence.

7.17.12 Depreciating UTXO Chains

The UTXO chain described in the ML protocol is designed to be perpetuated indefinitely, and thus maintains the same value as each new UTXO in the chain is generated. An alternative is to have a UTXO chain that depreciates, allowing for a system/service to be limited or controlled. For example, this limit could be based on:

a fixed time period, a certain number of transactions that contain embedded data, or a certain amount of data embedded in the core chain.

Let us consider a case where a service provider allows users to send transactions that contain embedded data to the blockchain, where the server maintains the full transaction data. When a user signs up to the service, the service provider mints the first UTXO in the chain, which should have a set value e.g., 1000 Satoshis that is assigned to the user's public key. This UTXO can be thought of as a token, but since its primary function is to chain a series of linked transactions, we refer to it as a UTXO or UTXO chain. Each time the user wishes to upload data, they create a carrier pair that spends the current UTXO and generates a new UTXO with a reduced value (several options are described below) as the output. This carrier pair, which creates the new link in the UTXO chain, is signed by users (akin to the MLTs in the base protocol) and is sent to the service provider.

The service provider checks the correct reduction in value has been applied to the user's UTXO and provides a second input to cover the core network transaction fee (as ML nodes do for MLBs in the base protocol). Service providers may combine the data carrier pairs from multiple users into a single transaction; since each user has their own independent UTXO and therefore index, each user's personal UTXO chain will be maintained.

7.17.13 Number of Transactions

To depreciate the UTXO value based on the number of data storage transactions made, each time a new UTXO is created in the chain the value should be a fixed amount less than the previous value. For example, if each UTXO in the chain has a value of 100 Satoshis less than its predecessor, ten transactions can be made from the initial mint of 1000 Satoshis. This system would particularly suit situations where uploads may not occur at regular intervals, for example maintaining the current version and history of a document or coding library.

7.17.14 Fixed Time Period

A similar process can be used to allow the UTXO chain to depreciate over a set time period. Each time a user wishes to make a data upload, they create and sign a carrier pair and reduce the value of the output UTXO by an amount that is proportionate to the time that has passed since minting (e.g., 10 Satoshis/day). The server verifies that the appropriate value has been used. Alternatively, each user's UTXO could be generated with a MultiSig or hash preimage spending requirement, such that either the user or the service provider can update the chain. With this setup, the service provider automatically generates a transaction (that may be empty) at regular intervals, reducing the value in the output UTXO each time. This system is suited for automatic backups that are scheduled to occur regularly, e.g., a backup of daily emails or company financial records.

7.17.15 Fixed Amount of Data

A third option is to reduce the value in the chained UTXOs based on the size of the data that is uploaded. Users form a carrier pair and reduce the value of the output (relative to the input value) according to the size of the data that is embedded. The service provider checks that the reduction is appropriate based on the size of the embedded data and the service fee rate before the transaction is sent to the core chain. It is possible for the transaction fee to be covered either by the chain UTXO or by the service provider, depending on the terms of the service. This system is appropriate for situations where data uploads may be infrequent and either large in size or have substantial variations in size, for example a user backing up their photos and videos.

In all the cases described above it is straightforward to top up the UTXO chain by creating a transaction where the current UTXO in the chain is used as an input, and an additional input provides extra funds that will be assigned to the new UTXO in the chain in the output of the transaction. This top-up transaction can be generated by the user, who would include inputs sufficient to cover the increase in the value of the chain UTXO and the appropriate payment to the service provider. Alternatively, a user could pay the service provider off-chain, and the service provider could generate the transaction to increase the value of the chain UTXO. These systems can be implemented by service providers to allow users to pre-pay for their service, and top-up when necessary. The actions of the service provider can be automated so that data uploads are instigated by users sending their carrier pairs to the service providers. In some situations, the users may also wish to automate the generation of carrier pairs so that they are set to occur automatically when certain conditions are met (e.g. daily or after a set amount of new data has been generated).

These systems mimic the gas concept on the Ethereum blockchain, where smart contracts are set to perform a set of instructions or code. A certain amount of gas is provided to the smart contract, and each iteration of the script (or each operation within a script) uses up a proportion of the gas, forcing the script to stop executing once the gas has run out. The systems described here could be used to run smart contracts as embedded data with Bitcoin acting as the core chain. An overlay system that runs the script can record each iteration in a new transaction in the UTXO chain, with the value of the output UTXO depreciating with each iteration. If desired, sub-sections of the code could be represented in separate carrier pairs within each transaction, for example if mid-state values need to be represented and retained. The system is also compatible with rollups where a series of computations are run 'off-chain' and only the final outcome along with a cryptographic proof that the outcome is valid are recorded on chain. Each time a rollup is generated, the outcome and proof can be embedded in a transaction within a UTXO chain, and the value of the output decreased according to the rate of gas consumption for off-chain computations.

8. Example Use Case

The following provides an example implementation where the same blockchain rules apply for both the secondary and core chains. This allows for the replication of certain features, namely:

Transaction model—this results in UTXO-based transactions that have the same serialisation format and MLV process for both secondary and core transactions.

Block model—the block structure, construction and validation are fundamentally similar for both secondary and core blocks, though the data for the secondary block is embedded within the MLB carrier transaction.

Consensus algorithm—when the same consensus rules apply, nodes will already have systems set up to perform the PoW computations that are required to produce a valid Bitcoin block.

Consider the following participants:

A user of the secondary blockchain—Alice ($PK_A$, $PK'_A$, $PK_2$, $PK'_2$)

A merchant accepting Bitcoin on the secondary blockchain—Mike ($PK_M$)

A participating node acting as ML node—Bob ($PK_B$, $PK_1$, $PK'_1$)

We assume that the ML protocol rules in use are:

The specific version number in use, $Version_{MLB}$=0x0000002A

All MLTs are set a locktime with no delay, $Locktime_{MLB}$=0x00000000

All MLTs use a final sequence number, $n_{MLB}$=0xFFFFFFFF

The PoW for the secondary chain is similar to that of the core chain and is built into the locking script of the block header UTXO. ML nodes must solve the hash puzzle described in Section 3.2.4 by finding a nonce and (embedded) block header $EBH_h$ such that:

$$H(H(EBH_h) \parallel H(EBH_{h-1})) < EDT$$

where EDT, is the difficulty target of the block to be embedded. The target is varied according to the combined hash power that ML nodes apply to producing MLBs to ensure that the average block production time for the secondary chain remains constant.

We now walk through the steps in the ML protocol providing examples with reference to the participants above. To differentiate between transactions on the secondary and core chains, the transaction figures will have green cells for secondary chain transactions, and blue cells for core chain transactions. Public keys on the secondary chain have alphabetical identifiers (e.g., $PK_A$), and public keys on the core chain have numerical identifiers (e.g., $PK_0$).

(1) Alice creates a Bitcoin transaction according to the rules of the secondary blockchain.

(a) Alice generates a secondary chain transaction $TxID_{embedded}$ as she would a regular Bitcoin transaction. FIG. 13 shows Alice's transaction, a simple P2PKH sending some value of Bitcoin $x_0$ to Mike's address $PK_M$, and assigning the remaining value to a change address $PK'_A$. The secondary chain transaction is authorised using Alice's public key $PK_A$ and signed with sighash ALL.

(a) Alice serialises the input and outputs in $TxID_{embedded}$ according to the format shown in FIG. 8. She then concatenates the resultant serialisations and places them in the full transaction serialisation shown in FIG. 8. The resulting format is a string of variable length containing all the information about $TxID_{embedded}$.

(2) Alice creates and broadcasts a MLT according to the rules of the ML protocol.

(a) Alice creates the MLT shown in FIG. 14. The carrier pair uses any UTXO Alice controls on the core chain as an input and assigns the same value to her address $PK'_2$ in the output. The output locking script contains the serialised form of $TxID_{embedded}$. The carrier pair is signed using Alice's public key $PK_2$ with sighash S|ACP.

(3) Bob receives Alice's MLT and forwards it to his peers in the secondary network.

(4) Bob verifies Alice's MLT and the embedded transaction according to the rules of the core and secondary blockchains.

(a) The two stages of the MLV process are identical for equivalent secondary and core blockchain protocols. The following checks are therefore conducted independently on the MLT and on the embedded transaction:

Each input references a valid UTXO in the corresponding UTXO set.

There is sufficient value in the inputs to cover the outputs plus any transaction fee; the user must include the transaction fee for the embedded transaction, while the carrier pair does not require a transaction fee.

All inputs are signed with valid signatures; multiple parties may collaborate to produce a single transaction, in accordance with the rules of the Bitcoin blockchain. All carrier pairs must be signed using the S|ACP sighash flag.

(5) Bob starts constructing a candidate MLB containing Alice's carrier pair.

(a) Bob includes carrier pairs submitted from Alice and other users in the secondary network in the candidate MLB from index 2 onwards. He creates and regularly updates the Merkle Tree for the secondary chain with each incoming secondary chain transaction.

(b) Bob constructs a secondary chain coinbase transaction in the same way that he would a regular coinbase transaction; an example is shown in FIG. 15. The null input has set values to indicate that there is no UTXO corresponding to the input, giving an outpoint with TxID=[ ] and index=0. The unlocking script in the output contains two values; the block height of the current block within the secondary chain and a 'coinbase script' field that may include an optional data string. Bob assigns himself the secondary chain block reward and transaction fees in the output.

(b) Bob serialises the secondary chain coinbase transaction and embeds it in the OP_RETURN of index 1 of the MLB (updating the Merkle tree in the embedded block header accordingly).

(c) Bob creates and updates the secondary chain block header data as he carries out PoW (and as new secondary chain transactions are received and embedded in the MLB) in the same way that he would a regular Bitcoin block header.

(d) Once Bob solves the PoW algorithm, he creates the block header UTXO chain link in index 0:

Outpoint: $\text{TxID}_{MLB_{h-1}}\|0$

Unlocking script: $\text{hash}(EBH_h)$

Output value: dust

Locking script: $<\text{hash}(EBH_h)>$ OP_CAT OP_SHA256 <EDT> OP_LESSTHAN

OP_RETURN data: $EBH_h$ (e) Bob adds a UTXO he controls in index 1 to cover the transaction fees of the MLB carrier transaction in the core network. He sets the output as his change address $PK'_1$, and embeds the serialised secondary chain coinbase transaction data in the OP_RETURN. Bob does not provide a signature for index 1 at this stage, because the MLB must still be verified. FIG. 16 shows Bob's candidate MLB.

(6) Bob broadcasts his candidate MLB to peers in the secondary network.

(7) Bob's peers verify his candidate MLB.

(a) Peers send confirmation of validity to Bob.

(b) All nodes in the secondary network add Bob's block to the secondary blockchain database.

(8) Bob adds his signature, $Sig_1$ ALL in index 1 to finalise his MLB and broadcasts it to the core network.

(9) Nodes in the core network construct a candidate block according to the core consensus rules.

(a) Bob's MLB is added to the mempool and included in candidate blocks in the core network.

(10) The winning candidate block is broadcast to peers in the core network.

(11) The winning block containing the MLB is verified by peers in the core network.

Figure 18:
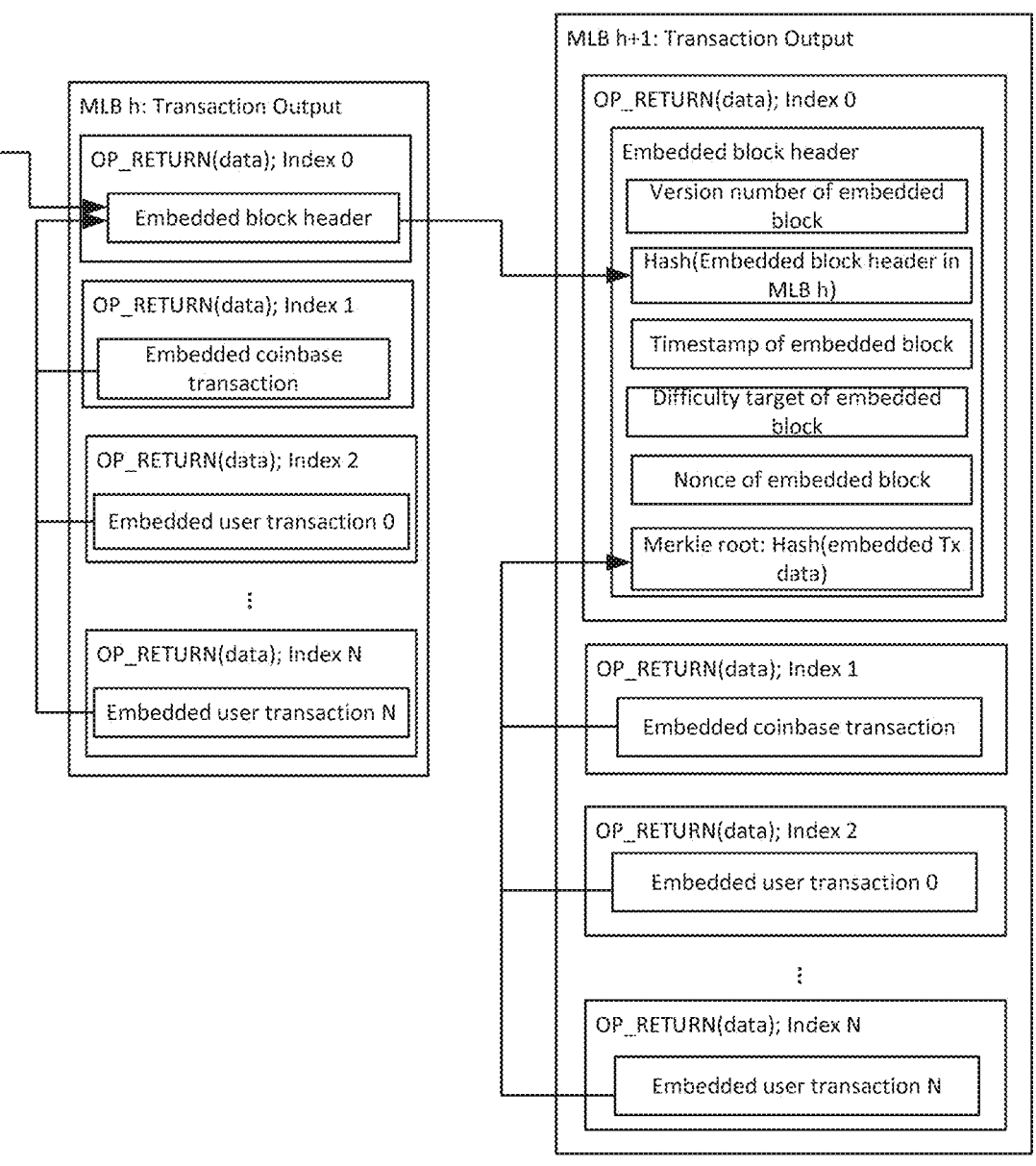
FIG. 18 is a schematic Illustration of a UTXO chain linking ML blocks, and FIG. 19 schematically illustrates an example blockpool protocol.

(a) Bob's MLB is published on the core chain. FIG. 18 illustrates the UTXO chain connecting MLB carrier transactions and FIG. 17 shows a mapping between the secondary chain block data to the data that appears in the MLB on the core chain.

9. Conclusion

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of using a multi-level (ML) data chain protocol to embed a data chain on a core blockchain, wherein the method is performed by a ML block producer and comprises:

obtaining one or more ML transactions, wherein each ML transaction comprises one or more respective carrier pairs, each carrier pair comprising a respective input and a respective output, wherein each respective output comprises respective data associated with the data chain, and wherein each respective input comprises a respective signature that signs the respective carrier pair;

generating a first ML block of the ML data chain, wherein the first ML block is a core blockchain transaction and comprises a) the respective carrier pairs of the obtained one or more ML transactions, wherein for each carrier pair, a respective position index of the respective input corresponds to a respective position index of the respective output, and b) a first chain output, wherein the first chain output is for being spent by a respective chain input of a subsequent ML block; and causing the first ML block to be recorded on the core blockchain.

Statement 2. The method of statement 1, wherein the core blockchain comprises one or more previous ML blocks, each previous ML block being a respective core blockchain transaction and comprises a) one or more carrier pairs, b) a respective chain output, and c) a respective chain input, wherein each respective chain input spends a respective chain output of a previous ML block such that the one or more previous ML blocks form a ML blockchain, and wherein the first ML block comprises c) a first chain input that spends a respective chain output of a previous ML block.

Statement 3. The method of statement 1 or statement 2, wherein said causing of the first ML block to be recorded on the core blockchain comprises submitting the first ML block to the core blockchain network.

Statement 4. The method of any preceding statement, wherein said causing of the first ML block to be recorded on the core blockchain comprises submitting a first core block to the core blockchain network, wherein the first core block comprises the first ML block.

Statement 5. The method of any preceding statement, wherein said obtaining of the one or more ML transactions comprises receiving at least one of the one or more ML transactions.

Statement 6. The method of any preceding statement, wherein said obtaining of the one or more ML transactions comprises generating at least one of the one or more ML transactions.

Statement 7. The method of statement 6, comprising:

receiving data to be included in a carrier pair; and generating at least one of the one or more ML transactions by including the received data in a carrier pair of the at least one ML transaction.

Statement 8. The method of statement 5 or any statement dependent thereon, comprising:

maintaining a memory pool of respective carrier pairs of received ML transactions; and generating the first ML block based on one or more of the respective carrier pairs stored in the memory pool.

Statement 9. The method of any preceding statement, comprising sending one or more of the obtained ML transactions to one or more ML block producers.

Statement 10. The method of any preceding statement, wherein the first ML block comprises a plurality of carrier pairs.

Statement 11. The method of any preceding statement, wherein the respective data is encrypted.

Statement 12. The method of statement 11, wherein the respective data is encrypted using a hash function.

Statement 13. The method of any preceding statement, wherein for each carrier pair, the respective signature signs only the input and output of that carrier pair.

Statement 14. The method of statement 13, wherein for each carrier pair, the respective signature is associated with a signature flag indicating that the respective signature signs only the input and output of that carrier pair.

Statement 15. The method of any preceding statement, wherein each ML transaction is an invalid transaction according to the core blockchain protocol.

Statement 16. The method of any preceding statement, wherein the data chain is a secondary blockchain, and wherein the respective data comprises a blockchain transaction of a secondary blockchain.

Statement 17. The method of statement 16, wherein the respective data of one of said carrier pairs of the first ML block comprises some or all of the secondary blockchain.

Statement 18. The method of any of statements 1 to 15, wherein the respective data comprises application-specific data.

E.g. data related to a specific communication or messaging application, e.g. an email application or social media application.

Statement 19. The method of any preceding statement, wherein the respective chain output of each respective ML block comprises a respective block header, and wherein the respective block header comprises a Merkle root of a Merkle tree, wherein the respective leaves of the Merkle tree are based on the respective data of the respective carrier pairs of the respective ML block.

Statement 20. The method of statement 19, wherein the respective block header comprises a timestamp indicating a time that the respective ML block was created and/or submitted to the core blockchain network.

Statement 21. The method of statement 19 or statement 20, wherein the first chain output comprises a locking script configured to implement a proof-of-work, PoW, puzzle, wherein the PoW puzzle comprises a first block header hash and a difficulty target, wherein the first block header hash is a hash of the respective block header of the first ML block, and wherein the locking script is configured to require a respective chain input of a subsequent ML block to comprise a respective block header hash that when combined with the first block header hash of the first ML block, a hash of the combination satisfies the difficulty target.

Statement 22. The method of statement 21 when dependent on statement 2, wherein the first chain input of the first ML block comprises the first block header of the first ML block, and wherein the first block header of the first ML block satisfies the difficulty target set by a PoW puzzle implemented by a locking script of the respective chain output of the previous ML block.

Statement 23. The method of statement 19 or statement 20, wherein the first chain output comprises a locking script configured to implement a PoW r-puzzle, wherein the PoW r-puzzle comprises a first hash value and a difficulty target, wherein the first hash value is a hash of the first block header combined with a first r-value, where the r-value is a component of a digital signature, and wherein the locking script is configured such that, in order to be unlocked, a respective chain input of a subsequent ML block is required to comprise i) a respective block header of the subsequent ML block and ii) a signature that uses the first r-value, and wherein the first locking script is configured to extract the first value from the signature, generate a second hash value as the hash of the respective block header combined with the extracted r-value, and verify that a hash of combination of the first and second hash values satisfies the target difficulty.

Statement 24. The method of statement 23 when dependent on statement 2, wherein the first chain input of the first ML block comprises i) the first block header of the first ML block and ii) a first signature that uses an r-value set by the respective chain output of the previous ML block, and wherein the first block header of the first ML block satisfies the difficulty target set by a PoW r-puzzle implemented by a locking script of the respective chain output of the previous ML block.

Statement 25. The method of any of statements 1 to 20, wherein the first chain output comprises one of:

a locking script locked to a public key associated with a ML block producer, a multi-signature locking script locked to one or more of a set of public keys, each public key being associated with a respective ML block producer, a locking script locked to a public key corresponding to a threshold private key, wherein the threshold private key is split into a plurality of private key shares, and each private key share is associated with a respective ML block producer, a locking script configured to implement a hash puzzle, wherein a preimage to the hash puzzle is made available to one or more ML block producers, a locking script configured to implement an r-puzzle, such that the locking script can be unlocked by any block producer with knowledge of a specific r-value.

Statement 26. The method of any preceding statement, wherein the ML block producer is a blockchain node of the core blockchain.

Statement 27. The method of any of statements 1 to 3, or 5 to 25, wherein the ML block producer is not a blockchain node of the core blockchain.

Statement 28. The method of statement 27, wherein the ML block producer is a simplified payment verification client.

Statement 29. The method of any preceding statement, wherein the respective chain output of each ML block comprises a respective locking script configured to implement the same type of consensus mechanism for unlocking the respective locking script.

That is, the consensus mechanism of each chain output is functionally equivalent, e.g. each chain output comprises a locking script configured to implement a PoW puzzle. Each chain output will comprise data specific to that chain output, e.g. a particular difficulty target, public key, previous block header hash, etc.

Statement 30. Computer equipment comprising:
memory comprising one or more memory units; and
processing apparatus comprising one or more processing units, wherein the memory stores code arranged to run on the processing apparatus, the code being configured so as when on the processing apparatus to perform the method of any preceding statement.

Statement 31. A computer program embodied on computer-readable storage and configured so as, when run on one or more processors, to perform the method of any of statements 1 to 29.

The invention claimed is:

1. A computer-implemented method of using a multi-level (ML) data chain protocol to embed a data chain on a core blockchain, wherein the method is performed by a ML block producer and comprises:

obtaining one or more ML transactions, wherein each ML transaction comprises one or more respective carrier pairs, each carrier pair comprising a respective input and a respective output, wherein each respective output comprises respective data associated with the data chain, and wherein each respective input comprises a respective signature that signs the respective carrier pair;

generating a first ML block of the ML data chain, wherein the first ML block is a core blockchain transaction and comprises a) the respective carrier pairs of the obtained one or more ML transactions, wherein for each carrier pair, a respective position index of the respective input corresponds to a respective position index of the respective output, and b) a first chain output, wherein the first chain output is for being spent by a respective chain input of a subsequent ML block; and causing the first ML block to be recorded on the core blockchain.

2. The method of claim 1, wherein the core blockchain comprises one or more previous ML blocks, each previous ML block being a respective core blockchain transaction and comprises a) one or more carrier pairs, b) a respective chain output, and c) a respective chain input, wherein each respective chain input spends a respective chain output of a previous ML block such that the one or more previous ML blocks form a ML blockchain, and wherein the first ML block comprises c) a first chain input that spends a respective chain output of a previous ML block.

3. The method of claim 1, wherein said causing of the first ML block to be recorded on the core blockchain comprises submitting the first ML block to a core blockchain network.

4. The method of claim 1, wherein said causing of the first ML block to be recorded on the core blockchain comprises submitting a first core block to a core blockchain network, wherein the first core block comprises the first ML block.

5. The method of claim 1, wherein said obtaining of the one or more ML transactions comprises receiving at least one of the one or more ML transactions, and wherein the method comprises:

maintaining a memory pool of respective carrier pairs of received ML transactions; and generating the first ML block based on one or more of the respective carrier pairs stored in the memory pool.

6. The method of claim 1, wherein said obtaining of the one or more ML transactions comprises generating at least one of the one or more ML transactions, and wherein the method comprises: receiving data to be included in a carrier pair; and generating at least one of the one or more ML transactions by including the received data in a carrier pair of the at least one ML transaction.

7. The method of claim 1, wherein for each carrier pair, the respective signature signs only the input and output of that carrier pair.

8. The method of claim 1, wherein each ML transaction is an invalid transaction according to the core blockchain protocol.

9. The method of claim 1, wherein the data chain is a secondary blockchain, and wherein the respective data comprises a blockchain transaction of the secondary blockchain.

10. The method of claim 9, wherein the respective data of one of said carrier pairs of the first ML block comprises some or all of the secondary blockchain.

11. The method of claim 1, wherein the respective data comprises application-specific data.

12. The method of claim 1, wherein the respective chain output of each respective ML block comprises a respective block header, and wherein the respective block header comprises a Merkle root of a Merkle tree, wherein the respective leaves of the Merkle tree are based on the respective data of the respective carrier pairs of the respective ML block.

13. The method of claim 12, wherein the respective block header comprises a timestamp indicating a time that the respective ML block was created and/or submitted to a core blockchain network.

14. The method of claim 12, wherein the first chain output comprises a locking script configured to implement a proof-of-work (PoW) puzzle, wherein the PoW puzzle comprises a first block header hash and a difficulty target, wherein the first block header hash is a hash of the respective block header of the first ML block, and wherein the locking script is configured to require a respective chain input of a subsequent ML block to comprise a respective block header hash that when combined with the first block header hash of the first ML block, a hash of the combination satisfies the difficulty target.

15. The method of claim 14, wherein:
the core blockchain comprises one or more previous ML blocks, each previous ML block being a respective core blockchain transaction and comprises a) one or more carrier pairs, b) a respective chain output, and c) a respective chain input, wherein each respective chain input spends a respective chain output of a previous ML block such that the one or more previous ML blocks form a ML blockchain, and wherein the first ML block comprises c) a first chain input that spends a respective chain output of a previous ML block; and
the first chain input of the first ML block comprises a first block header of the first ML block, and wherein the first block header of the first ML block satisfies the difficulty target set by a PoW puzzle implemented by a locking script of the respective chain output of the previous ML block.

16. The method of claim 12, wherein the first chain output comprises a locking script configured to implement a PoW r-puzzle, wherein the POW r-puzzle comprises a first hash value and a difficulty target, wherein the first hash value is a hash of the first block header combined with a first r-value, where the r-value is a component of a digital signature, and wherein the locking script is configured such that, in order to be unlocked, a respective chain input of a subsequent ML block is required to comprise i) a respective block header of the subsequent ML block and ii) a signature that uses the first r-value, and wherein the first locking script is configured to extract the first value from the signature, generate a second hash value as the hash of the respective block header combined with the extracted r-value, and verify that a hash of combination of the first and second hash values satisfies the target difficulty.

17. The method of claim 16, wherein:
the core blockchain comprises one or more previous ML blocks, each previous ML block being a respective core blockchain transaction and comprises a) one or more carrier pairs, b) a respective chain output, and c) a respective chain input, wherein each respective chain input spends a respective chain output of a previous ML block such that the one or more previous ML blocks form a ML blockchain, and wherein the first ML block comprises c) a first chain input that spends a respective chain output of a previous ML block; and
the first chain input of the first ML block comprises i) the first block header of the first ML block and ii) a first signature that uses an r-value set by the respective chain output of the previous ML block, and wherein the first block header of the first ML block satisfies the difficulty target set by a PoW r-puzzle implemented by a locking script of the respective chain output of the previous ML block.

18. The method of claim 1, wherein the first chain output comprises one of:
a locking script locked to a public key associated with a ML block producer,
a multi-signature locking script locked to one or more of a set of public keys, each public key being associated with a respective ML block producer,
a locking script locked to a public key corresponding to a threshold private key, wherein the threshold private key is split into a plurality of private key shares, and each private key share is associated with a respective ML block producer,
a locking script configured to implement a hash puzzle, wherein a preimage to the hash puzzle is made available to one or more ML block producers,
a locking script configured to implement an r-puzzle, such that the locking script can be unlocked by any block producer with knowledge of a specific r-value.

19. Computer equipment of a multi-level (ML) block producer comprising:
memory comprising one or more memory units; and
processing apparatus comprising one or more processing units, wherein the memory stores code arranged to run on the processing apparatus, the code being configured so as when run on the processing apparatus, the processing apparatus performs a method of using a ML data chain protocol to embed a data chain on a core blockchain, wherein the method is performed by the ML block producer and comprises:
obtaining one or more ML transactions, wherein each ML transaction comprises one or more respective carrier pairs, each carrier pair comprising a respective input and a respective output, wherein each respective output comprises respective data associated with the data chain, and wherein each respective input comprises a respective signature that signs the respective carrier pair;
generating a first ML block of the ML data chain, wherein the first ML block is a core blockchain transaction and comprises a) the respective carrier pairs of the obtained one or more ML transactions, wherein for each carrier pair, a respective position index of the respective input corresponds to a respective position index of the respective output, and b) a first chain output, wherein the first chain output is for being spent by a respective chain input of a subsequent ML block; and causing the first ML block to be recorded on the core blockchain.

20. A computer program embodied on non-transitory 5 computer-readable storage media and configured so as, when run on one or more processors, the one or more processors perform a method of using a multi-level (ML) data chain protocol to embed a data chain on a core blockchain, wherein the method comprises: 10 obtaining one or more ML transactions, wherein each ML transaction comprises one or more respective carrier pairs, each carrier pair comprising a respective input and a respective output, wherein each respective output comprises respective data associated with the data 15 chain, and wherein each respective input comprises a respective signature that signs the respective carrier pair;

generating a first ML block of the ML data chain, wherein the first ML block is a core blockchain transaction and 20 comprises a) the respective carrier pairs of the obtained one or more ML transactions, wherein for each carrier pair, a respective position index of the respective input corresponds to a respective position index of the respective output, and b) a first chain output, wherein 25 the first chain output is for being spent by a respective chain input of a subsequent ML block; and causing the first ML block to be recorded on the core blockchain.

\* \* \* \* \* 30

52